United States Patent
Neumeier et al.

(10) Patent No.: US 10,727,960 B2
(45) Date of Patent: Jul. 28, 2020

(54) SYSTEM AND METHODS OF DETECTING HUMAN PRESENCE IN THE VICINITY OF A RADIO FREQUENCY RECEIVER SYSTEM

(71) Applicant: INSCAPE DATA, INC., Irvine, CA (US)

(72) Inventors: Yedidia Neumeier, Scarsdale, NY (US); Zeev Neumeier, Berkeley, CA (US); Samuel Gessow, Berkeley, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 16/003,273

(22) Filed: Jun. 8, 2018

(65) Prior Publication Data
US 2019/0379467 A1  Dec. 12, 2019

(51) Int. Cl.
| | | |
|---|---|---|
| *H04B 17/30* | (2015.01) | |
| *H04B 15/02* | (2006.01) | |
| *H01Q 21/00* | (2006.01) | |
| *H04B 17/318* | (2015.01) | |
| *H04W 24/02* | (2009.01) | |

(52) U.S. Cl.
CPC ............ *H04B 17/30* (2015.01); *H04B 15/02* (2013.01); *H01Q 21/00* (2013.01); *H04B 17/318* (2015.01); *H04W 24/02* (2013.01)

(58) Field of Classification Search
CPC ...... H04B 15/005; H04B 15/02; H04B 17/21; H04B 17/30; H04B 17/309; H04B 17/318; H04B 17/327; H04W 24/02; H04W 24/04; H04W 24/06; H04W 24/08; H01Q 21/00
See application file for complete search history.

(56) References Cited

U.S. PATENT DOCUMENTS

| | | | |
|---|---|---|---|
| 10,175,340 B1* | 1/2019 | Abari ...................... G01S 7/006 |
| 10,305,766 B1* | 5/2019 | Zhang ..................... H04L 43/08 |
| 2010/0277363 A1* | 11/2010 | Kainulainen ........... G01S 3/023 342/174 |
| 2014/0306840 A1* | 10/2014 | Koerber .................. G01S 7/032 342/107 |
| 2016/0149315 A1* | 5/2016 | Elsherbini ............ H01Q 21/245 455/101 |
| 2017/0180062 A1* | 6/2017 | Johansen ................ H04W 4/70 |
| 2017/0192435 A1* | 7/2017 | Bakhishev ........... G05D 1/0246 |

\* cited by examiner

*Primary Examiner* — Candal Elpenord
(74) *Attorney, Agent, or Firm* — Polsinelli LLP

(57) ABSTRACT

The present disclosure relates generally to occupancy detection, and more particularly to detecting a change in the occupancy of a predetermined area using a passive antenna array. In certain embodiments, baseline signals may be received by an antenna array associated with a display device. The baseline signals may analyzed to detect a baseline of radio frequency signals present in a predetermined area. New radio frequency signals may be received at a later time. The new signals may be analyzed to reveal characteristics of the new signals. Characteristics of the new signals may be compare to characteristics of the baseline signals to determine if the new signals differ from the baselines signals by more than a threshold amount. One or more actions may be executed in response to determining that the new signals differ from the baseline signals by more than the threshold amount.

20 Claims, 17 Drawing Sheets

EXAMPLE OF RADIO FREQUENCY OF AN OBJECT BETWEEN A TRANSMITTER AND A RECEIVER

EXAMPLE OF RADIO FREQUENCY INTERFERENCE DETECTED BY A RECEIVER FROM A DISTANT SOURCE

EXAMPLE OF A DISPLAY DEVICE EQUIPPED WITH
AN ANTENNA ARRAY

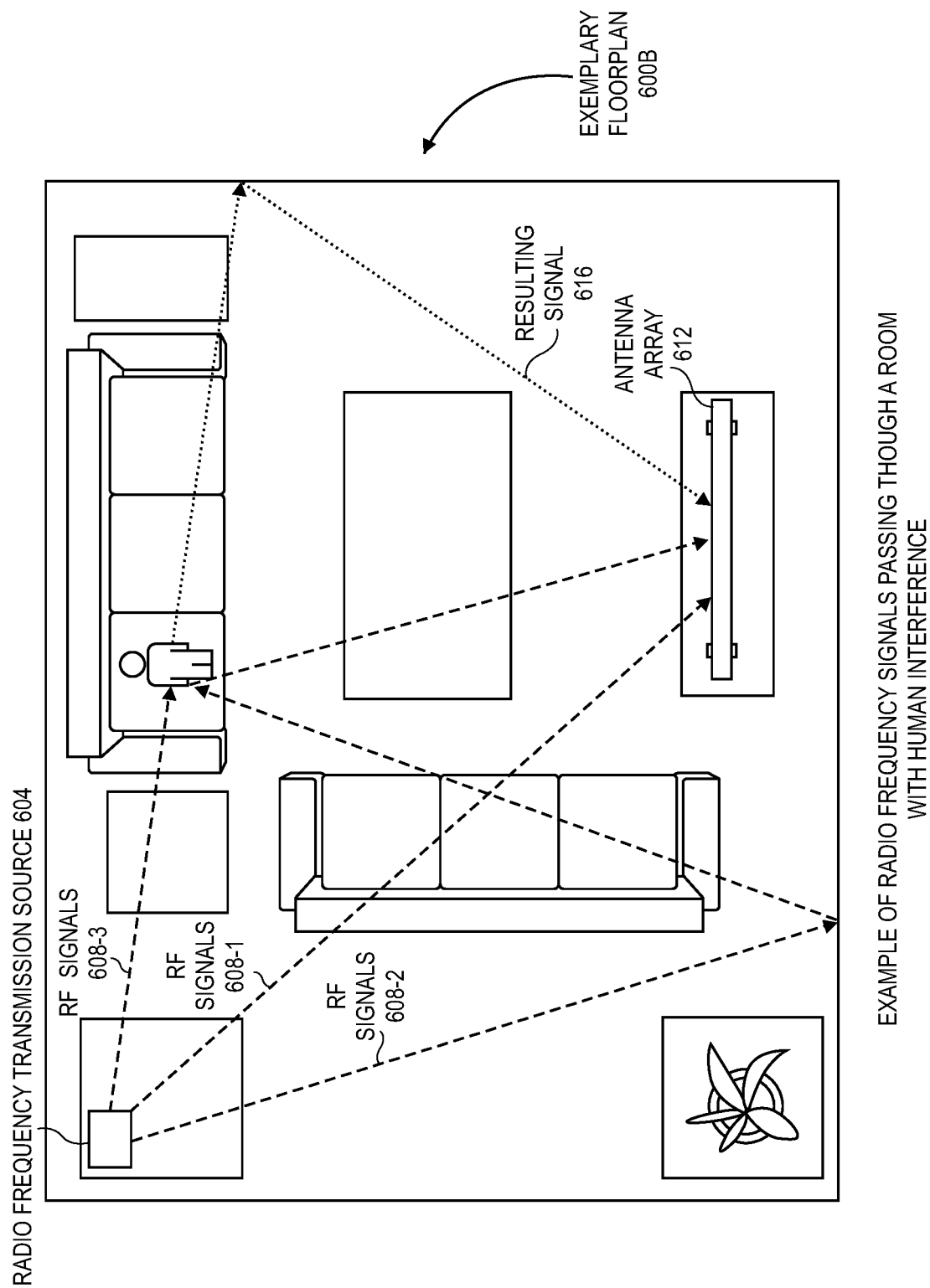

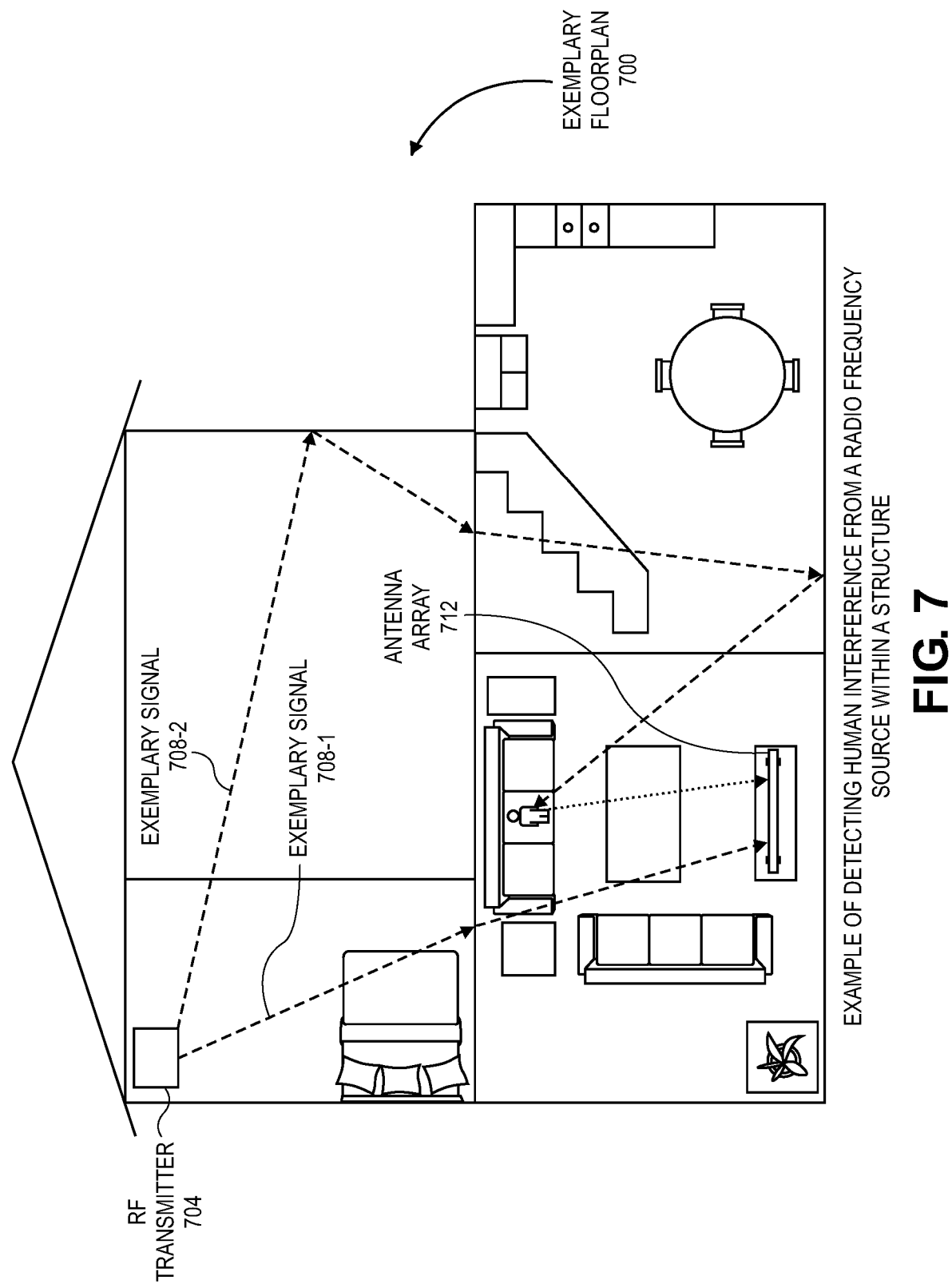

EXAMPLE OF DETECTING HUMAN INTERFERENCE FROM A RADIO FREQUENCY SOURCE EXTERNAL TO A STRUCTURE

SYSTEM AND METHODS OF DETECTING HUMAN PRESENCE IN THE VICINITY OF A RADIO FREQUENCY RECEIVER SYSTEM

SUMMARY

The present disclosure relates generally to occupancy detection, and more particularly to detecting the occupancy of a predetermined area using one or more radio frequency receivers.

In certain embodiments, an antenna array may be provided for detecting interference by the presence of objects within a predetermined area. For example, an antenna array may be provided and configured to detect radio frequency (RF) signals within a predetermined area. The received signals may be analyzed to detect characteristics of the signals. The analyzed signals may be used to define a baseline of the RF signals in the predetermined area. Upon receiving new RF signals at a later time, the new signals may be compared to the baseline to determine an amount of interference present in the predetermined area. For example, interference may be caused by an object that absorbs or reflects RF signals in the predetermined area, such that when the new signals are received, the characteristics of the new signals differ from that of the baseline. The presence of interference in the predetermined area may indicate a change in the occupancy (e.g. objects) of the predetermined area.

In some embodiments, an antenna array may be provided in a device to detect the occupancy of a predetermined area associated with that device. For example, an antenna array may be provided within a display device, such as a television, to detect the occupancy of a predetermined area within view of the display surface of the television. The antenna array may receive one or more RF signals within the predetermined area at a first time or during a first period to create a baseline of the RF signals present in the predetermined area at that time or during the period. For example, the antenna array may detect the one or more signals at a time when the occupancy of the predetermined area may be readily known or inferred. New RF signals may be received at a later time. The new RF signals may be compared to the baseline to determine whether a change in the occupancy of the predetermined area has occurred. In response to detecting the change in occupancy, one or more operations may be executed.

In some examples, methods, systems, or non-transitory machine readable storage medium may be provided for detecting an occupancy of a predetermined area. The method comprises: receiving one or more baseline signals at antennas of an antenna array, wherein the antenna array is focused to receive baseline signals that are within a predetermined area; measuring one or more baseline amplitudes produced by the antenna array as a result of receiving each baseline signal, wherein the one or more baseline amplitudes is indicative of the predetermined area having a baseline occupancy; displaying content on a display device; receiving one or more new signals at antennas of the antenna array, wherein the one or more new signals are received after the one or more baseline signals; measuring one or more new amplitudes produced by the antenna array as a result of receiving the new signals; comparing the one or more new amplitudes to the one or more baseline amplitudes; determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and executing one or more actions based on the new occupancy.

In some examples, the method may additionally or alternatively include other features. For example, the one or more baseline signals and the one or more new signals may be received on a frequency of one of 2.4 GHz and 5 GHz. The antenna array may be included in the display device, where the predetermined area includes an area in which content displayed by the display device is viewable. The one or more baseline signals may be received over a period of a predefined duration. The new occupancy may be indicative of a viewer of the display device being within the predetermined area. The new occupancy may be indicative of two or more viewers of the display device being within the predetermined area.

In some examples, the method may additionally or alternatively may include receiving subsequent signals at antennas of the antenna array, wherein the subsequent signals are received after the one or more new signals; measuring one or more subsequent amplitudes produced by the antenna array as a result of receiving the subsequent signals; comparing the one or more subsequent amplitudes to the one or more baseline amplitudes; and determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

In some examples, the system comprises one or more processors; an antenna array configured to receive one or more signals, the antenna array being focused to receive signals that are within a predetermined area; and a non-transitory machine readable storage medium containing instructions, which when executed on the one or more processors, cause the one or more processors to perform operations including: receiving one or more baseline signals at antennas of an antenna array, wherein the antenna array is focused to receive baseline signals that are within a predetermined area; measuring one or more baseline amplitudes produced by the antenna array as a result of receiving each baseline signal, wherein the one or more baseline amplitudes is indicative of the predetermined area having a baseline occupancy; displaying content on a display device; receiving one or more new signals at antennas of the antenna array, wherein the one or more new signals are received after the one or more baseline signals; measuring one or more new amplitudes produced by the antenna array as a result of receiving the new signals; comparing the one or more new amplitudes to the one or more baseline amplitudes; determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and executing one or more actions based on the new occupancy.

In some examples, the system may additionally or alternatively include other features. For example, the one or more baseline signals and the one or more new signals may be received on a frequency of one of 2.4 GHz and 5 GHz. The antenna array may be included in the display device, where the predetermined area includes an area in which content displayed by the display device is viewable. The one or more baseline signals may be received over a period of a predefined duration. The new occupancy may be indicative of a viewer of the display device being within the predetermined area. The new occupancy may be indicative of two or more viewers of the display device being within the predetermined area.

In some examples, the system may additionally or alternatively may include receiving subsequent signals at antennas of the antenna array, wherein the subsequent signals are received after the one or more new signals; measuring one or more subsequent amplitudes produced by the antenna array as a result of receiving the subsequent signals; comparing the one or more subsequent amplitudes to the one or more baseline amplitudes; and determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

In some examples, the non-transitory machine readable storage medium may contain instructions, which when executed on one or more processors, cause the one or more processors to perform operations including: receiving one or more baseline signals at antennas of an antenna array, wherein the antenna array is focused to receive baseline signals that are within a predetermined area; measuring one or more baseline amplitudes produced by the antenna array as a result of receiving each baseline signal, wherein the one or more baseline amplitudes is indicative of the predetermined area having a baseline occupancy; displaying content on a display device; receiving one or more new signals at antennas of the antenna array, wherein the one or more new signals are received after the one or more baseline signals; measuring one or more new amplitudes produced by the antenna array as a result of receiving the new signals; comparing the one or more new amplitudes to the one or more baseline amplitudes; determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and executing one or more actions based on the new occupancy.

In some examples, the transitory machine readable storage medium may contain instructions, which when executed on one or more processors, cause the one or more processors to perform additional or alternative operations that include other features. For example, the one or more baseline signals and the one or more new signals may be received on a frequency of one of 2.4 GHz and 5 GHz. The antenna array may be included in the display device, where the predetermined area includes an area in which content displayed by the display device is viewable. The one or more baseline signals may be received over a period of a predefined duration. The new occupancy may be indicative of a viewer of the display device being within the predetermined area. The new occupancy may be indicative of two or more viewers of the display device being within the predetermined area.

In some examples, the transitory machine readable storage medium may contain instructions, which when executed on one or more processors, cause the one or more processors to perform additional or alternative operations including: receiving subsequent signals at antennas of the antenna array, wherein the subsequent signals are received after the one or more new signals; measuring one or more subsequent amplitudes produced by the antenna array as a result of receiving the subsequent signals; comparing the one or more subsequent amplitudes to the one or more baseline amplitudes; and determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 6B is a diagram depicting an example of radio frequency signals passing through a room with human interference.

FIG. 7 depicts an example of detecting human interference from a radio frequency source within a structure.

Figure 1:
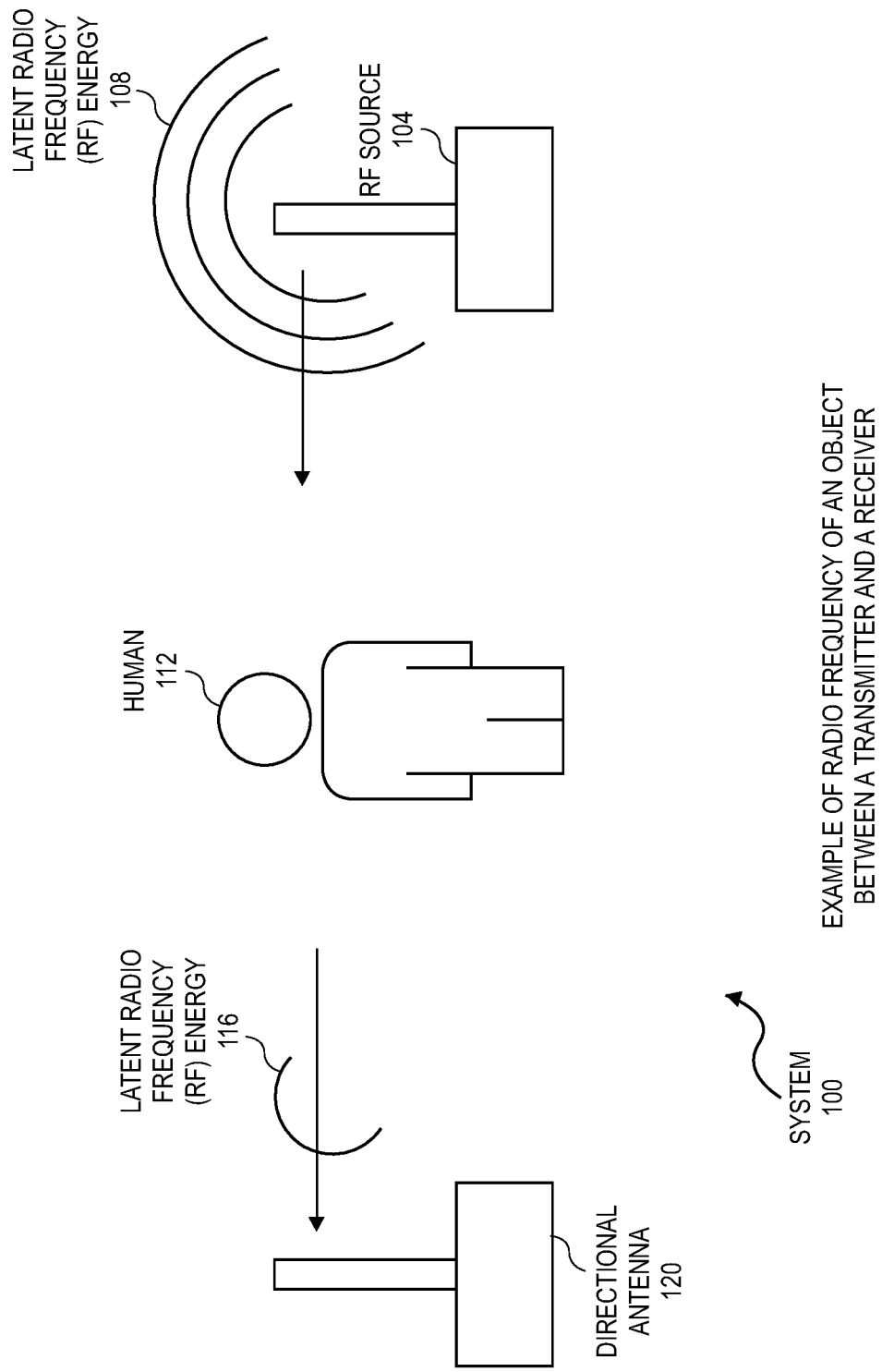
FIG. 1 depicts an example of radio frequency interference of an object between a transmitter and a receiver.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments of the present disclosure provides methods and systems for detecting an occupancy of an area using an antenna array capturing latent radio frequency signals present in the area. As used herein, the term occupancy may refer to inanimate objects, animate objects, human individuals, and/or anything that may be detected as present in (or absent from) a defined area. The antenna array may be focused to receive signals within a predetermined area (e.g. 1-4 meters in front of the array) to determine the occupancy with respect to the predetermined area. The antenna array may receive a first set of signals to form a baseline of the radio frequency signals that are present in the area at a time in which the occupancy of the area is known. A second set of signals may be received by the antenna array and compared to the baseline to determine a difference between the second set of signals and the first set of signals. The difference may indicate that a change in the occupancy of the area has occurred.

In some examples, the present disclosure provides methods for receiving baseline RF signals at antennas of an antenna array. The baseline signals may be analyzed to measure one or more characteristics (e.g., amplitude, origin, frequency, and/or the like) of the baseline signals. The one or more characteristics may be indicative of the predetermined area having a baseline occupancy. The methods can continue by displaying content on a display device. Upon detecting new signals being received at antennas of the antenna array, the new signals may be analyzed to measure one or more characteristics associated with the new signals. The one or more characteristics of the baseline signals may then be compared to the one or more characteristics of the new signals. In response to the comparison, it may be determined whether the one or more characteristics of the baseline signals differ from the one or more characteristics of the new signals by more than a threshold amount. The difference may indicate that the baseline occupancy has changed to a new occupancy. The content presented by the display device can be automatically updated based on detecting the new occupancy.

In yet another embodiment, the present disclosure provides systems for receiving baseline signals at antennas of an antenna array. The baseline signals may be analyzed to measure one or more characteristics (e.g., amplitude, origin, frequency, and/or the like) of the baseline signals. The one or more characteristics may be indicative of the predetermined area having a baseline occupancy. The systems continue by displaying content on a display device. Upon detecting new signals being received at antennas of the antenna array, the new signals may be analyzed to measure one or more characteristics associated with the new signals. The one or more characteristics of the baseline signals may then be compared to the one or more characteristics of the new signals. In response to the comparison, it may be determined whether the one or more characteristics of the baseline signals differ from the one or more characteristics of the new signals by more than a threshold amount. The difference may indicate that the baseline occupancy has changed to a new occupancy. The systems conclude by automatically updating content of the display device based on detecting the new occupancy.

In yet another embodiment, the present disclosure provides a non-transitory machine-readable storage medium containing instructions, which when executed on one or more processors, cause the one or more processors to perform operations including: receiving baseline signals at antennas of an antenna array. The baseline signals may be analyzed to measure one or more characteristics (e.g., amplitude, origin, frequency, and/or the like) of the baseline signals. The one or more characteristics may be indicative of the predetermined area having a baseline occupancy. The operations continue by displaying content on a display device. Upon detecting new signals being received at antennas of the antenna array, the new signals may be analyzed to measure one or more characteristics associated with the new signals. The one or more characteristics of the baseline signals may then be compared to the one or more characteristics of the new signals. In response to the comparison, it may be determined whether the one or more characteristics of the baseline signals differ from the one or more characteristics of the new signals by more than a threshold amount. The difference may indicate that the baseline occupancy has changed to a new occupancy. The operations conclude by automatically updating content of the display device based on detecting the new occupancy.

In some examples, an antenna array may be used to simulate a synthetic-aperture radar system. Synthetic-aperture radar systems are radars used to generate two or three dimensional images by transmitting radio frequency signals as the system moves and detecting the reflection of the radio frequency signals off a surface. The same image may be generated by combining sequentially received radio frequency signals across different antennas within an antenna array. For example, each antenna of the array may receive the same radio frequency signal, but at slightly different times due to the slight variations in distance between the antennas. The variation in which the radio frequency signals are received may be used to calculate various characteristics of each signal and the properties of the environment occupied by the antenna array.

The antenna array may also receive multiple, different versions of the same signal that have been affected in some way by the environment. For example, a first version of a signal may be received directly from a radio frequency source (e.g. without any interference). A second version of the signal may be received after experiencing some form of interference (e.g., reflection off a surface and/or absorption by that surface). By aggregating the data analyzed from each received radio frequency signal, the distance and origin of the radio frequency source may be determined. Further, by detecting variations in phase, the origin of the radio frequency signal may be determined as a reflection from a surface (additionally indicating a material of the surface based on the alteration to the received signal) or as a direct source of the radio frequency signal. Receiving a multiple versions of a radio frequency signal at the antenna array may enable the generation of a map of an area, or as noted above, a two or three dimensional image of the area.

In some examples, the antenna array may be a passive array that does not transmit radio frequency signals, but uses received latent radio frequency signals that are transmitted by other devices to determine an occupancy. As used herein, the term latent may refer to an radio frequency single that may be detectable in a predetermined area. Latent may refer to radio frequency signals that originate within or external to the predetermined area. The antenna array may receive latent radio frequencies within the area. For example, the antenna array may be used to receive WiFi radio frequencies (e.g. at 2.4 GHz or 5 GHz) that may be present in the area. The antenna array may receive radio frequency signals on any number of frequencies, including WiFi frequencies, cellular frequencies (e.g. 800 MHz and/or 1900 MHz), Amplitude Modulated (AM) frequencies (e.g. 535-1605 kHz), Frequency Modulation (FM) frequencies (e.g., 88-108 MHz), Very High Frequencies (VHF) (e.g., 54-210 MHz), Ultra High Frequencies (UHF) (e.g., 470-884 MHz), and/or any other frequency. The antenna array may receive signals over one or more frequency ranges and is not limited to receiving signals over any particular, single frequency range.

A processing device using the an antenna array may measure the change in an existing radio frequency signal as a result of the radio frequency signal being absorbed/reflected by different surfaces of an area. For example, a change in energy and phase of the signal that is received by the antenna array can be measured. Each radio frequency signal may be altered differently as each signal interacts with a material of a surface or object. For example, energy from a radio frequency signal at 2.4 gigahertz may be more likely to be absorbed by water. Since the human body consists of approximately 60% water, the human body may absorb radiation from radio frequency signals at 2.4 GHz. With the combination of WiFi radiation at 2.4 GHz and the properties of the human body, detecting changes in WiFi radiation can form a basis for detecting the presence of one or more humans within an area. As noted above, any suitable radio frequency other than 2.4 GHz may also be employed to accomplish the same task. For example, radio frequency signals at 5 GHz may be less affected by the water of a human and thus more likely to be reflected than absorbed. For signals at 5 GHz, detecting changes in distance, direction, and/or phase may also be an indicator for the presence of one or more humans (or other objects). The precise difference between a first signal and a subsequent signal that may indicate a change in occupancy can depend on the particular characteristics (e.g. frequency, amplitude, etc.) of the received radio frequency signals.

Based A radio frequency signal may be used as a baseline radio frequency signal. As used herein, the term baseline may refer any an initial value, such as a radio frequency signal, which may be used as a reference point to determine a difference in a later acquired value, such as the same radio frequency signal received again at a later time. A baseline may be determined at any point using any particular data point (e.g., one or more radio frequency signals, frequencies, amplitudes, and/or the like). For example, a baseline radio frequency signal may be used to determine whether a characteristic of the same radio frequency signal received later has changed in some measurable way (e.g., change in frequency, amplitude, etc.). In some examples, a baseline radio frequency signal may represent the state of an area as including one or more objects and excluding a human occupant. In other examples, a baseline radio frequency signal may represent the state of an area as including one or more object and one or more human occupants. In those examples, subsequent radio frequency signals may be compared to the baseline radio frequency signal to determine if the one or more human occupants are still present in the area or have departed the area.

Based on the differences in frequency, amplitude, and phase of received radio frequency signals, certain types of objects may be filtered from the present area to generate a map, an image, and/or an indication of the presence or absence of a particular type of object in the area. For example, non-human objects (e.g., walls, furniture, animals, etc.) in a room may be filtered out to determine the presence or absence of just human occupants in the area. The number of humans and their relative positions within the room may be determined in addition to the direction of movement relative to the antenna array. In some examples, the occupancy of an area may be combined with other data, such as a particular media item being displayed by a display device within the area. In those examples, the combination of occupancy and other data may be used to provide an indication that one or more individuals were exposed to or viewed the particular media.

Referring first to FIG. 1, depicting a system 100 for the detection of an occupancy of a defined area using latent radio frequency (RF) energy 108/116 received by a single omni-directional antenna 120. Occupancy can be detected in any suitable defined area. One illustrative example of a defined area can include a room of a building (e.g., a home, an office building, or any other suitable building). Other defined areas can include an indoor or outdoor venue (e.g., a park, a concert venue, a sports venue, and/or any other suitable venue). As used herein, the term "room" refers to a space that occupies a portion of a larger structure, where the dimensions and/or volume of the room are defined but limited only by the dimensions and/or volume of the larger structure.

The single omni-directional antenna 120 may be employed to detect one or more RF signals 108 (e.g., emitted from a RF source 104) at a time in which the room is likely to be empty (e.g. at 2:00 AM). Since a human body affects the radiation distribution within the area of the omni-directional antenna 120 by both water absorption and partial reflection, signals received at a later time may be compared to the one or more RF signals 108 to detect a change in signal characteristics. The single omni-directional antenna 120 may detect changes in the magnitude and angle of the received radiation, which reflect changes in the number of and/or position of humans near the omni-directional antenna 120. For example, the one or more baseline RF signals 108 emitted from the RF source 104 may be altered once the one or more baseline RF signals 108 interact with a human 112 (e.g., reflect off of the human 112 and/or absorbed by the human 112) to become one or more modified RF signals 116, which is a different version of the original one or more baseline RF signals 108.

The single omni-directional antenna 120 may be used to identify the difference between the one or more RF signals 108 and the one or more modified RF signals 116 to determine that an interferer (e.g., human 112) may be present in the room. In some examples, the single omni-directional antenna 120 may be focused to receive RF waves from a particular area within a room, such as a space that is 2-4 meters from antenna 120. In such examples, the change in magnitude and angle of the received signal may indicate a location of a person within the room. Further, by detecting the type of interference that is detected, a type of object interfering with the RF signal may be determined (e.g., inanimate object, animate object, human, etc.) as well a material of that object (e.g., metal, drywall, wood, organic material, etc.).

Figure 2:
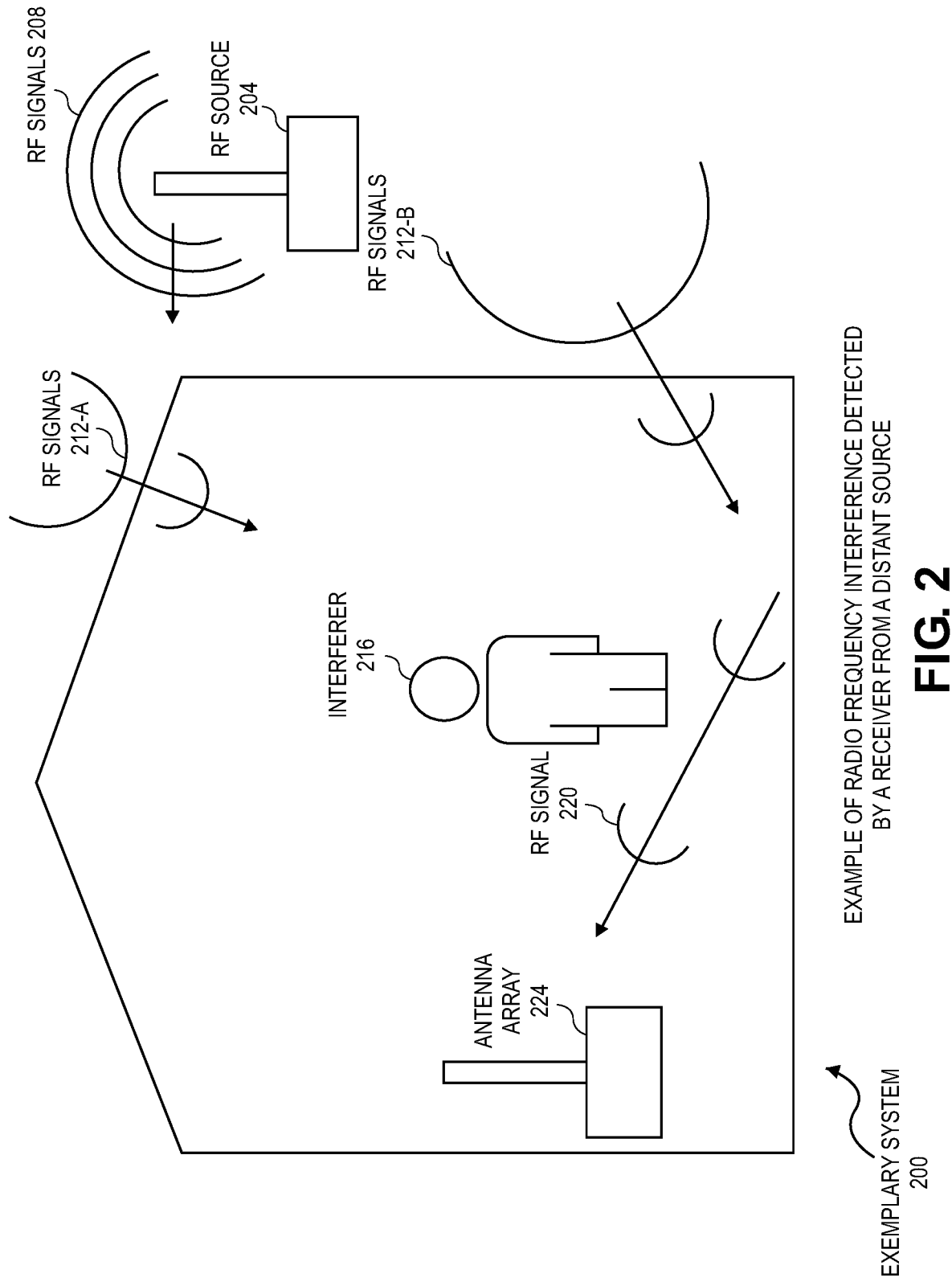
FIG. 2 depicts an example of radio frequency interference detected by a receiver from a distant source.

In some examples, the occupancy detection as described herein may use radio frequency signals transmitted from a remote RF source. For example, FIG. 2 depicts an exemplary system 200 for the detection of an occupancy of a predetermined area (e.g., a room, a building, etc.) using RF signals 208 from a source 204 external to the area and received by an antenna array 224. The RF source 204 may be a source that originates close to or far away from the area. For example, the RF source 204 may be a WiFi gateway located in a neighboring area (e.g., a nearby house, business, apartment, hotspot, etc.). The RF source 204 may be latent RF signals from a remote resource such as those transmitting over AM or FM frequencies. The RF source 204 emits radio frequency (RF) signals 208 that pass through a defined area and detected by an antenna array 224. RF signals 208 may be altered (by reflection and/or absorption) as the signals 208 interact with various objects. For example, RF signals 208 passing through a wall of a neighboring structure may be modified, in which case the energy may be reduced (e.g. due to absorption by a material of the wall), the direction of travel may change (e.g., due to reflection), and the phase may change (e.g., due to absorption and reflection).

The RF signals 208 from the RF source 204 may be modified any number of ways as the signals pass through various materials. RF signals 212-A and 212-B represent different versions of the same source signal 208 that have slight variations due to different paths of travel. For example RF signal 212-A may have reflected off of a car, causing the signal to travel upwards, which gives the appearance that the source of the signal was located above the antenna array 224. The signal 212-B may have reflected off of a different object, causing the signal to enter the area from a lower trajectory. Huygens principle of diffusion of radiative sources describes how energy scatters around an area from sources both internal and external to the area. For example, a space "illuminated" by RF energy is similar to diffused light caused by sunlight through a window or from artificial light sources hitting a wall. In this manner, where each point is acting as a source, the effect of an interferer (e.g., a floor, a wall, a person, or the like) on the overall amplitude of a single received RF signal may be negligible. Yet, an antenna focused in a direction can detect the presence of an interferer 216 by aggregating multiple characteristics of a multiple signals (e.g., distance, origin, frequency, strength, phase, etc.).

Upon receiving signal 212-A and signal 212-B, a baseline of the signals that appear in the area (e.g., without the human 216) may be determined. In some examples, the receiving antenna array 224 may receive signals over a period of time (such as over a period of an a hour, a day, a month, etc.), or at a same time of day over a period of time (e.g., for an hour every day at 2:00 PM), to form a baseline of signals that may regularly appear in the area. The baseline signals may be used to generate a baseline occupancy, an image, a map, and/or the like of the area in which the antenna array is tuned. In some examples, the baseline signals may be aggregated and/or averaged over time to account for variability of the external signal source 204 or other interference. For example, if the signal 212-A only enters the area from above, due to reflection off of a passing car or other object, then the signal 212-A may only be briefly received by the antenna array from that angle. Averaging the signals (or aggregating a plurality of signals) received by the antenna array 224 may insulate a baseline from the impact that may be caused by brief interferences or outlier signals.

Once the baseline RF signals are determined, the antenna array 224 may receive additional RF signals and compare the additional RF signals to the baseline RF signals to determine if there is a measureable difference. For example, as a result of a human 216 entering the area, signal 212-A or signal 212-B may experience additional interference (i.e. reflection and absorption), thus forming RF signal 220. The antenna array 224 may identify a change in energy, phase, and/or direction of the signal. Based on comparing RF signal 220 and the baseline RF signals, the occupancy of the interfering human 216 may be detected. As noted above, other occupants (e.g., inanimate or animate objects) as well as movement of occupants may also be detected. In some examples, the antenna array 224 may be used to generate a video (e.g., 24 or more images per second) that depicts the objects moving through the area (in real-time) based on the objects interfering with the signals received by the antenna array 224.

Figure 3:
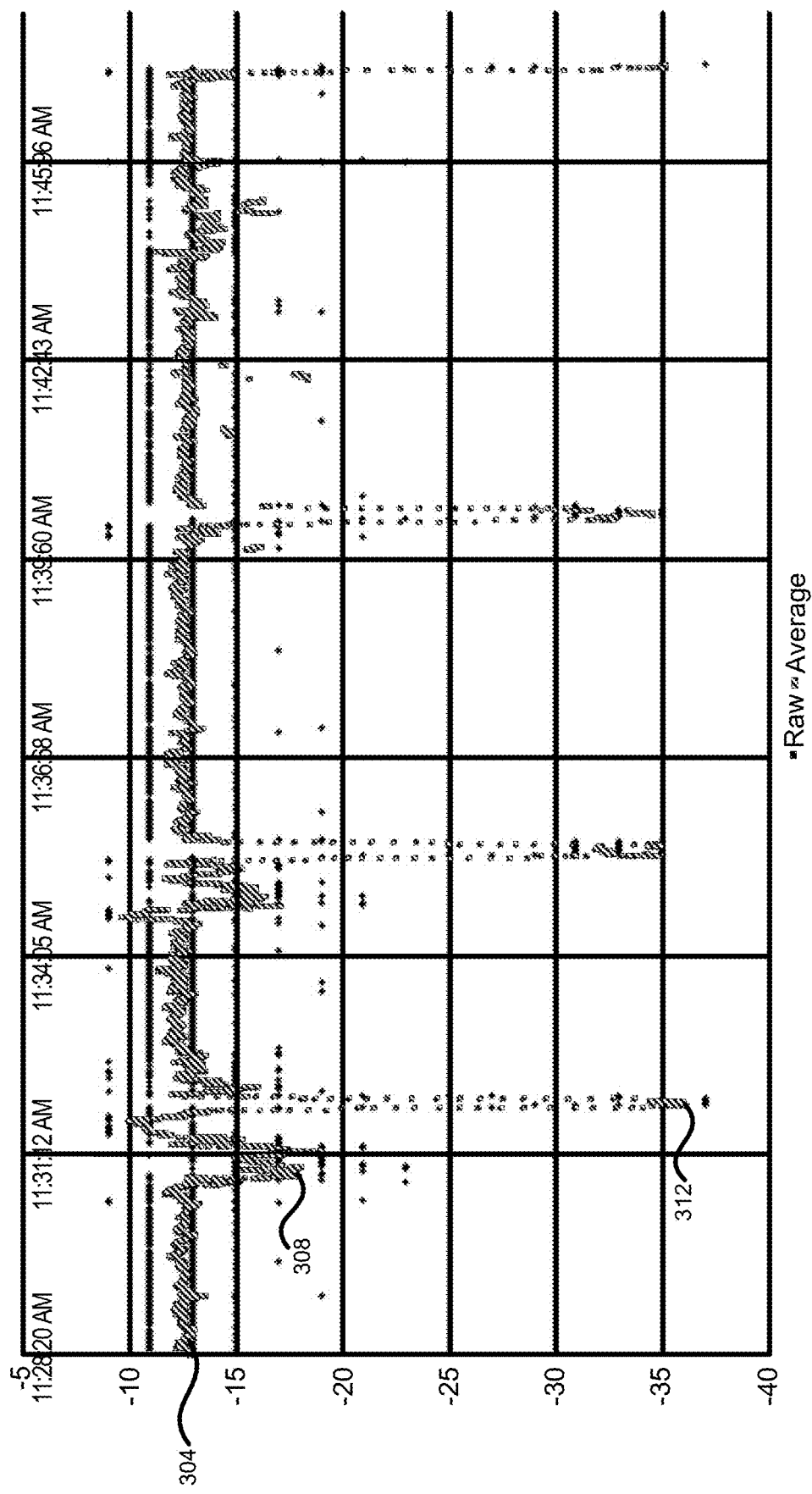
FIG. 3 depicts a graphical representation of signals received by a radio frequency receiver.

FIG. 3 depicts a graph of data points associated with radio frequency signals at a frequency of 2.4 Ghz that are received at an antenna over time. The graph shows that a human can be detected by an antenna array. Two sets of data points are depicted in the graph. A first set of data points corresponds to an amount of energy in decibels (dB) of each signal received over a period of time and may be represented in the graph with a solid line. A second set of data points represent an average strength of the received RF signals over the same period of time and may be represented with the diagonal line filled lines. The strength of RF signals changes based on an interferer positioned in the signal path of an antenna. At a data point 304, the received signal strength is approximately −12.5 decibels. This represents a baseline signal strength when the area is unoccupied. A human approaching the antenna array is represented by the data point 308. The approaching human interferes with the RF signals being received by the antenna, which results in a reduction of the received signal of about 7 dB (e.g., in this case due to absorption of RF radiation by the human body at 2.4 GHz). An extreme case may be represented at data point 312. The data point 312 occurs when the human occupant physically covers the antenna, which results in a 25 dB drop in signal strength.

Figure 4:
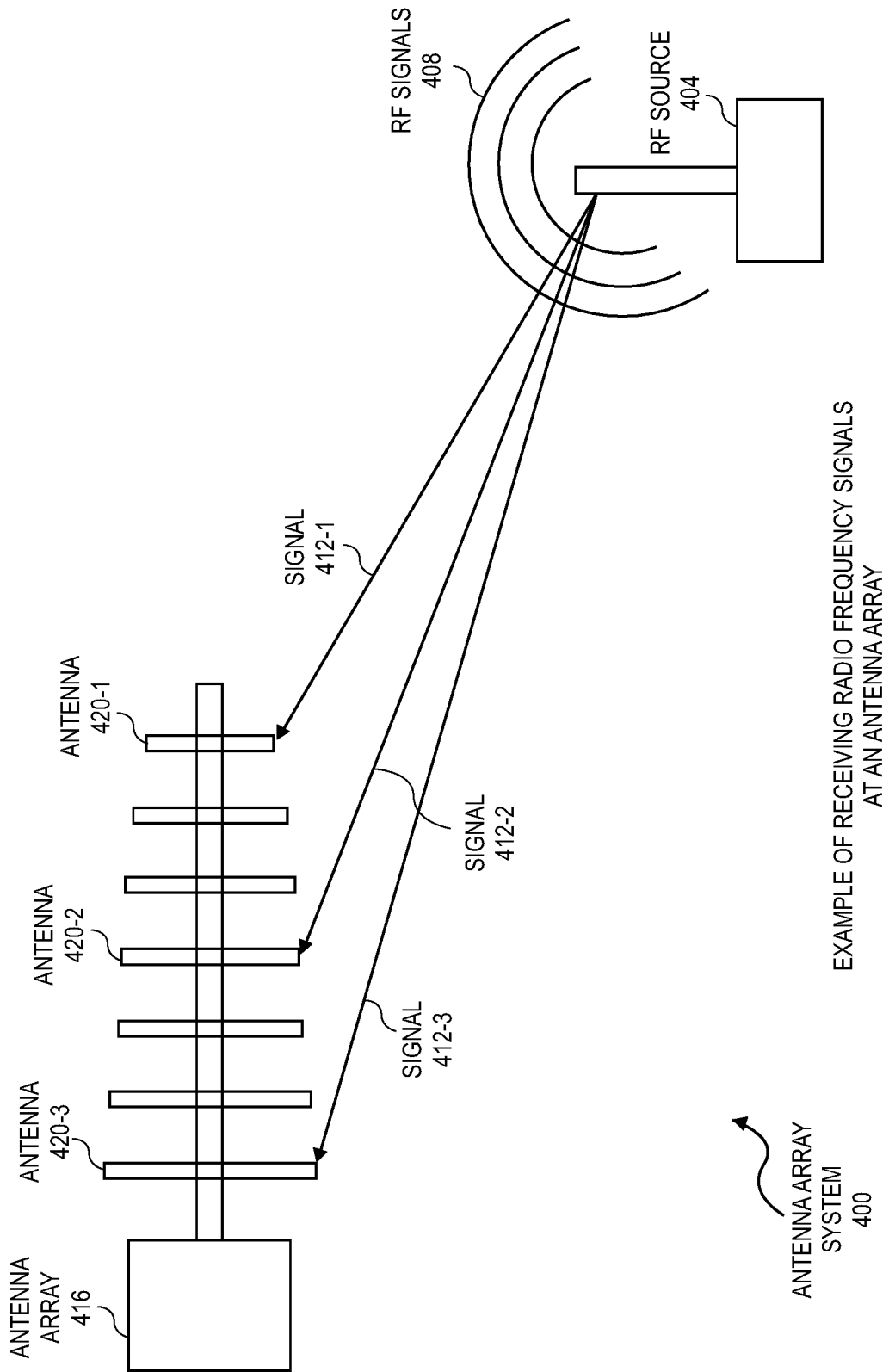
FIG. 4 depicts an example of receiving radio frequency signals at an antenna array.

FIG. 4 depicts an antenna array system 400 that receives signals from a single source 404. The antenna array 416 includes a plurality of individual antennas (e.g. 420-1, 420-2, 420-3, etc.) spaced apart by a defined distance. In the example depicted, three signals 412-1, 412-2, 412-3 may be received by three antennas 420-1, 420-2, 420-3 respectively. However, an antenna array may have any number of antennas which may be employed to each received a signal (or receive a plurality of signals each over time). The source 404 transmits signals 408. The signals 412-1, 412-2, and 412-3 represent the signals 408 as they are received by the antennas 420-1, 420-2, and 420-3, respectively. The signals 412-1, 412-2, and 412-3 will travel slightly different lengths based on the antenna that each respective signal 412-1, 412-2, 412-3 reaches and based on the angle of the source 404 to the antennas 420-1, 420-2, and 420-3. The time of travel $t_1$, $t_2$, and $t_3$, respectively, of each signal 412-1, 412-2, 412-3 to each antenna 420-1, 420-2, and 420-3, respectively, can be measured to determine a distance and angle of each signal between the source 404 the antennas 420-1, 420-2, 420-3. It is still possible to determine the distance and direction without knowing the time between transmission and reception, provided that the same signal is received at two or more different antennas. In that case, the time the RF signal is received at a first antenna may be referred to $t_1=0$, and the latency in reception between other antennas may be defined as the delta or difference between the reception at the first antenna and the reception of the signal at the second antenna (e.g., $t_2=t_1+x$ and $t_3=t_2+y$). Thus, the antenna array in receiving the same signal by more than one antenna may determine the direction of the transmitting source 404 and the distance to the transmitting source 404.

In some examples, an antenna array may be used to detect multiple sources within an area. The number of antennas that the antenna array has may determine how many distinct sources are detectable. As noted above, in order to detect at least one source, two different antennas may be used to detect the latency in receiving the same signal at the two different antennas. Since the two antennas have a known distance between them, the distance and direction of the source may be determined by calculating the angles of the triangle formed by (for an example) the RF signal 412-1, 412-2, and the line formed by the distance between antennas 420-1 and 420-2. While two antennas may be used to detect the distance and direction to a single transmitting source. To detect N transmitting sources the antenna array may have 2N+1 antennas.

Figure 5:
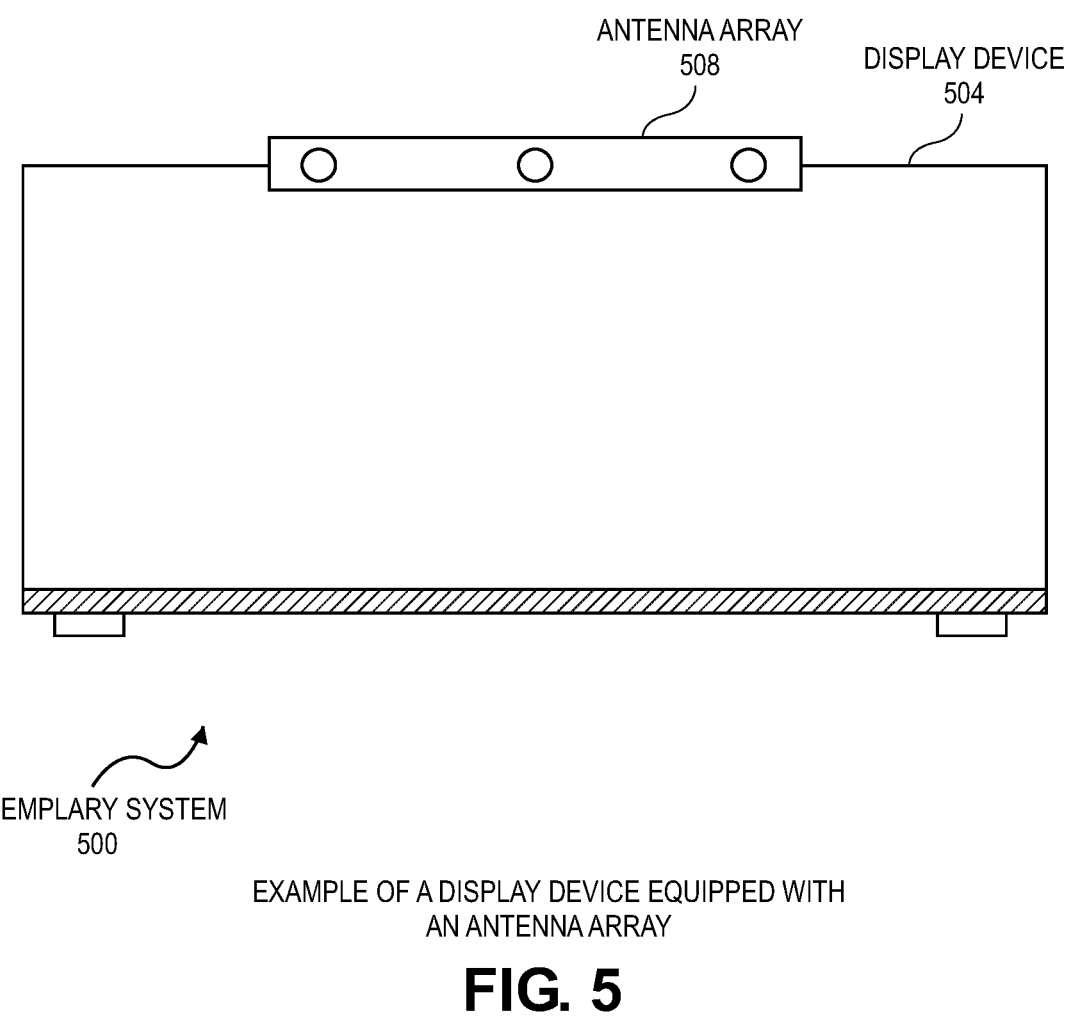
FIG. 5 depicts an example of a display device equipped with an antenna array.

FIG. 5 depicts and exemplary system 500 including an antenna array 508 to detect the occupancy of a room. The antenna array 508 may be installed into a display device 504. The display device 504 can include any device with a display, such as a television, a computer monitor, a mobile device, or other suitable device. For example, the antenna array 508 may detect the occupancy of an area opposing a visible surface of the display device 504, such that a determination may be made as to whether a particular video segment displayed by the display device is within view of the one or more occupants. In some examples, display device 504 is in communication with a remote server and transmits an indication as to whether a video segment displayed by the display device 504 was in-view by one or more humans and how many humans were in-view. In some examples, antenna array 508 may not be installed or attached to the display device 504. In those examples, the antenna array may be positioned relative to the display device such that an in-view status of a surface of the display device may be readily determined.

Figure 6A:
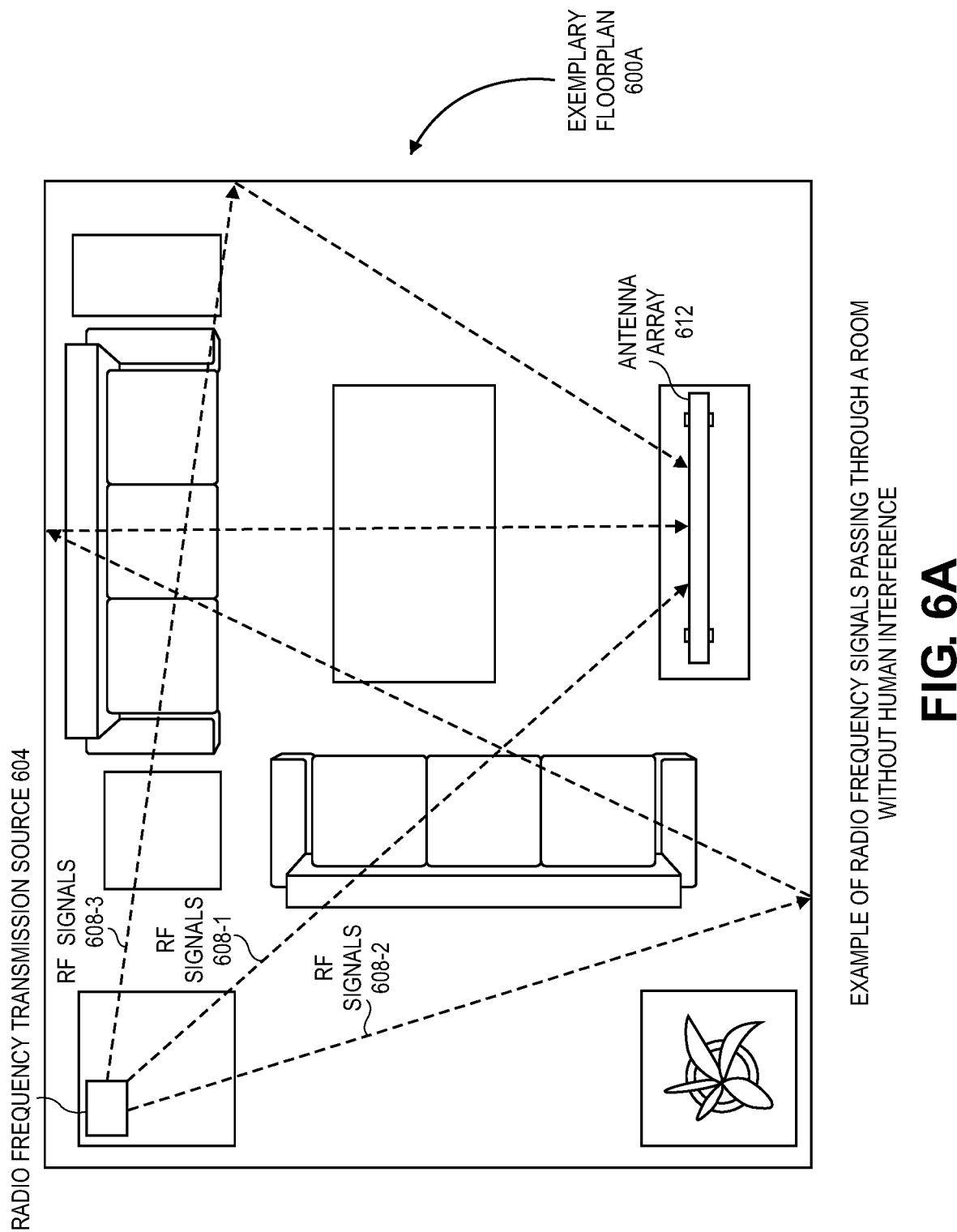
FIG. 6A depicts an example of radio frequency signals passing through a room without human interference.

FIG. 6A and FIG. 6B depict detecting an exemplary floorplan of a room within a house in which an occupancy may be detected. FIG. 6A depicts an exemplary floorplan 600 of an empty room (e.g., no human occupants). A radio frequency transmission source 604 is emitting RF radiation. For example, the radio frequency transmission source 604 may be a WiFi router operating a 2.4 GHz or 5 GHz frequency band. Although depicted within the same room as the receiving antenna array 612 (e.g. built into a display device such as display device 504), the radio frequency transmission source 604 may be transmitting in an external room or outside the structure of the house or building (e.g., see FIGS. 7 and 8). As shown in FIG. 6*a*, the RF signals emitted by the source 604 reflect off the surfaces of the room to reach the antenna array 612. The dashed lines show a simplified set of paths that the RF energy may follow as it reflects off of the walls. Although three RF signals are shown 608-1, 608-2, and 608-3, any number of RF signals may be emitted from the source 604 which may follow the signal paths shown and/or other paths not shown to reach the antenna array. With no interference from an absorbing entity such as a human in the room, the antenna array 612 will receive a plurality of radio frequency signals at various strengths and angles. Each antenna element of 612 will receive the RF signals at a differing phase angle based on the summation of the RF vectors arriving on the surface of each antenna element, as described previously in connection with FIG. 4. The pattern of phase angle difference conveys a latency difference which can be recorded as a default pattern.

The default pattern may be associated with a likelihood of an occupancy an area to form a baseline of the radio frequency signals that may be present in an area when no humans are present. For example, the default pattern may be determined at a time when the area is likely to be empty such as 4:00 AM or 2:00 PM on a Tuesday. By forming a baseline with a likelihood of a particular occupancy (e.g., no humans), the baseline may be used to determine if the occupancy has changed. For example, if the baseline differs from one or more RF signals received at a later time, then there is an indication that an interferer (i.e. human) has either entered the area or left the area.

FIG. 6B depicts the same floorplan 600 as depicted in FIG. 6A, but with an occupant to show how a change in occupancy may affect RF signals passing through the room. The human occupant is sitting on a couch across from a display device with a built-in antenna array 612. The presence of a human may alter one or more of the RF signals as the signals travel inside the room. For example, RF signal 608-1 may be unaffected as the human is not located between the emitting source 604 and the antenna array 612. RF signals 608-2 and 608-2 may be affected by the presence of the human. RF signal 608-2 may reflect off of the human instead of the wall behind the human (as shown in FIG. 6A, 608-2). Antenna array 612 may receive a weaker signal 608-2 due to partial absorption of the signal's energy by the human. In addition, RF signal 608-3 had more of its energy absorbed by the human as it passed through the human. The resulting signal 616, although on a similar, if not the same trajectory, may be measured as having significantly smaller amplitude and/or altered phase angle. The antenna array 612 may still receive each of the signals 608-1, 608-2, and 608-3, but detect the change in direction, intensity, and distance of 608-2, and the intensity and phase angle of 608-3/616. The combined signals received by antenna array may register a detectably different pattern among the antenna arrays of 612. The difference in signals from the baseline of FIG. 6A may indicate the occupancy of one or more humans in the room near the antenna array 612.

The occupancy of a room and/or an entire structure can be determined by comparing one or more RF signals received by an antenna array to a baseline set of RF signals received at time in which the room and/or the entire structure is likely to be empty. In some examples, such as that depicted in FIG. 6A and FIG. 6B, the RF signals are transmitted within the same room as the antenna array. In some examples, the occupancy of a room and/or an entire structure may be determined from RF signals transmitted from another room of the structure (e.g. see FIG. 7 below). For example, many buildings have WiFi gateways that transmit signals throughout the building. These signals may be received by an antenna array to both generate a baseline when the occupancy is known and to identity a current occupancy based on a comparison to the baseline. In other examples, the occupancy of a room and/or an entire structure may be determined from RF signals transmitted from a source external to the structure (e.g. see FIG. 8 below). In those examples, the antenna array may receive signals across a plurality of frequencies to increase the accuracy of the occupancy determination.

FIG. 7 is a diagram illustrating an exemplary floor plan 700 of building in which an occupancy of a room may be detected based on RF signals that are transmitted from outside the room. The two story structure includes a room with a RF transmitter (such as WiFi gateway) 704. In some examples, the RF transmitter transmits RF signals on a particular frequency band such as 2.4 GHz or 5 GHz. In some examples, the RF transmitter 704 transmits RF signals in a variety of frequencies such as both 2.4 GHz and 5 GHz, AM/FM frequencies, and/or any other frequency. Although only two RF signals are depicted, any number of signals may be transmitted at any given time or time period. In addition the RF signals may travel a variety of paths and not just those paths depicted by FIG. 7. The RF signals may be represented as vectors (e.g., including both a magnitude such as amplitude and direction) to calculate the distance and direction of the RF signals.

Exemplary signal 708-1 is depicted as traveling along a semi-direct path in which the signal passes through the floor of the structure to ultimately arrive at the antenna array. The angle of reception of RF signal 708-1 may change based on the material and density of the medium through which the RF signal 708-1 passes (i.e., the floor). Exemplary signal 708-2 is traveling along different path through an adjacent room prior to reflecting of a surface to travel towards the antenna array 712. Exemplary signal 708-2 may additionally be affected by a human occupant of the room. For example, a portion of the energy of signal 708-2 may be absorbed by the human causing the received signal to have a smaller amplitude. The receiving signal may be compared to a baseline signal (or signals) to determine a difference between the RF signal 708-2 and a baseline signal. The difference between the signals may indicate the presence of the human occupant and the distance and position of the human occupant relative to the antenna array.

RF signals may reflect off more than one surface and/or pass through more than medium (floors, walls, etc.) before being received by the antenna array 712. Further, some signals transmitted from RF transmitter 704 may not reach the antenna array at all. Those signals may reflect from a surface in a path traveling away from antenna array 712. Provided some RF signals transmitted from the RF transmitter 704 are received by the antenna array 712, the occupancy of an area (e.g., the room including the antenna array 712) and/or the occupancy of the entire structure may be determined.

The occupancy of a room and/or an entire structure can be determined by comparing one or more RF signals received by an antenna array to a baseline set of RF signals received at time in which the room and/or the entire structure is likely to be empty. In some examples, such as that depicted in FIG. 6A, FIG. 6B, and FIG. 7, the RF signals are transmitted within the room (FIG. 6A and FIG. 6B) or within the structure (FIG. 7). For example, many buildings have WiFi gateways that transmit signals at 2.4 GHz or 5 GHz. These signals may be received by an antenna array to both generate a baseline when the occupancy may be known or inferred and detect a change in occupancy based on a comparison to the baseline. The antenna array 812 may receive RF signals over a plurality of frequencies.

Figure 8:
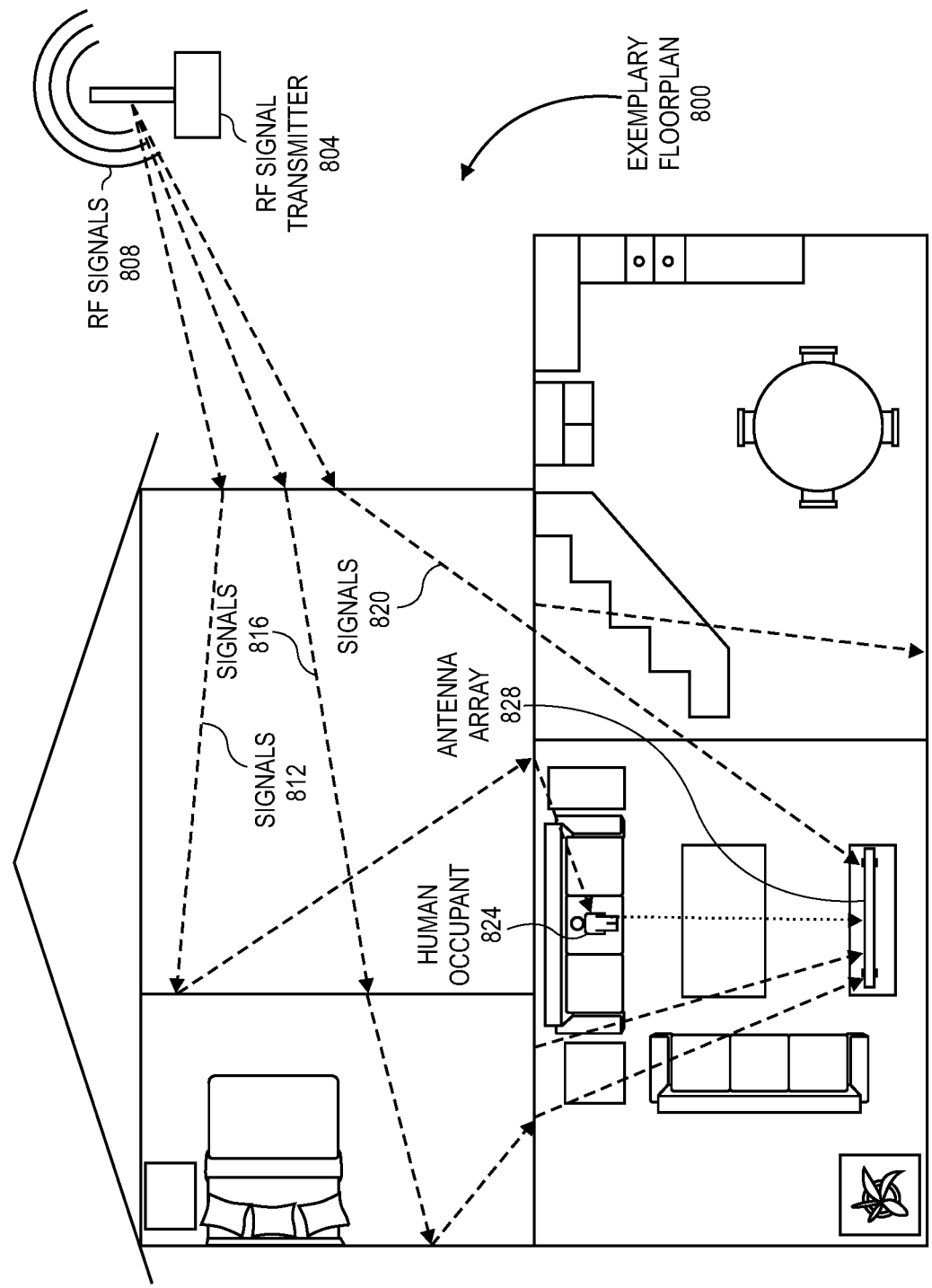
FIG. 8 depicts an example of detecting human interference from a radio frequency source external to a structure.

FIG. 8 is a diagram illustrating an exemplary floor plan 800 of building in which an occupancy of a room may be detected based on RF signals that are transmitted from a source outside the structure. For example, an antenna array in an apartment may receive RF signals from one or more WiFi gateways in adjacent apartments. Even in locations with few adjacent or nearby structures (e.g., rural locations) or locations with few or no adjacent WiFi transmitters, an antenna array within a structure can be used to determine an occupancy of that structure using RF signals on other frequencies. For example, RF transmitter may be associated with cellular frequencies (e.g. 800 MHz and/or 1900 MHz), Amplitude Modulated (AM) frequencies (e.g. 535-1605 kHz), Frequency Modulation (FM) frequencies (e.g., 88-108 MHz), Very High Frequencies (VHF) (e.g., 54-210 MHz), Ultra High Frequencies (UHF) (e.g., 470-884 MHz), and/or any other frequency. In some examples, antenna array 828 may receive some RF signals on a WiFi frequency band (e.g., 2.4. GHz and/or 5 GHz) and/or one or more additional RF signals on other frequencies.

RF signal transmitter 804 may transmits RF signals 808 from a location that is remote from the structure and antenna array 828. Although only one RF transmitter is shown other RF transmitters may also be transmitting RF signals over one or more frequencies. Antenna array 828 may receive one or more RF signals such as signals 816 and 820 at a time when the occupancy of the structure is likely to be empty (e.g., Tuesday at 1:00 PM when human occupant 824 is likely at work) or when the occupancy of the room containing the antenna array is likely to be empty (e.g., at 4:00 AM when human occupant 824 is asleep). The received signals may be used to generate a baseline of RF signals. In some examples, the baseline may be an average of the signals received over a particular time period or set of time periods. In some examples, the baseline RF signals may be used to generate a map, image, or video of the room containing the antenna array or the structure.

Three exemplary RF signals 812, 816, and 820 are depicted from RF source 804 and travel through floor plan 800. As each RF signal 812, 816, and 820 travel along different paths to reach the structure, the respective paths within the structure may also vary. For example, RF signal 812 may be partially reflected upon passing through the outer wall of an upper area of the structure, reflected again upon connecting with a first wall within the structure, pass through the floor to reflect from a human occupant 824 before being received by the antenna array 828. RF signals 812 and 820 also pass through the floor plan 800 and reflect off the internal surfaces of the structure and are received by the antenna array 828. Although only three exemplary RF signals are shown, any number of RF signals may pass through the structure which may follow any one of a number of different based on the transmission source location, distance, and materials of the structure etc.

Upon receiving signals 812, 816, and 820 at antenna array 828, the signals may be compared to a baseline to determine if the occupancy has changed. For example, it may be determined that received signals have a different amplitude or phase than the amplitude or phase of the baseline signals. In some examples, the position and/or distance of the interferer (e.g. human) relative to the antenna array may be determined. Although only one occupant is depicted in FIG. 8, comparing received signals to the baseline signals can detect more than one occupant based the a degree in which the received signals differ from the baseline signals.

Figure 9:
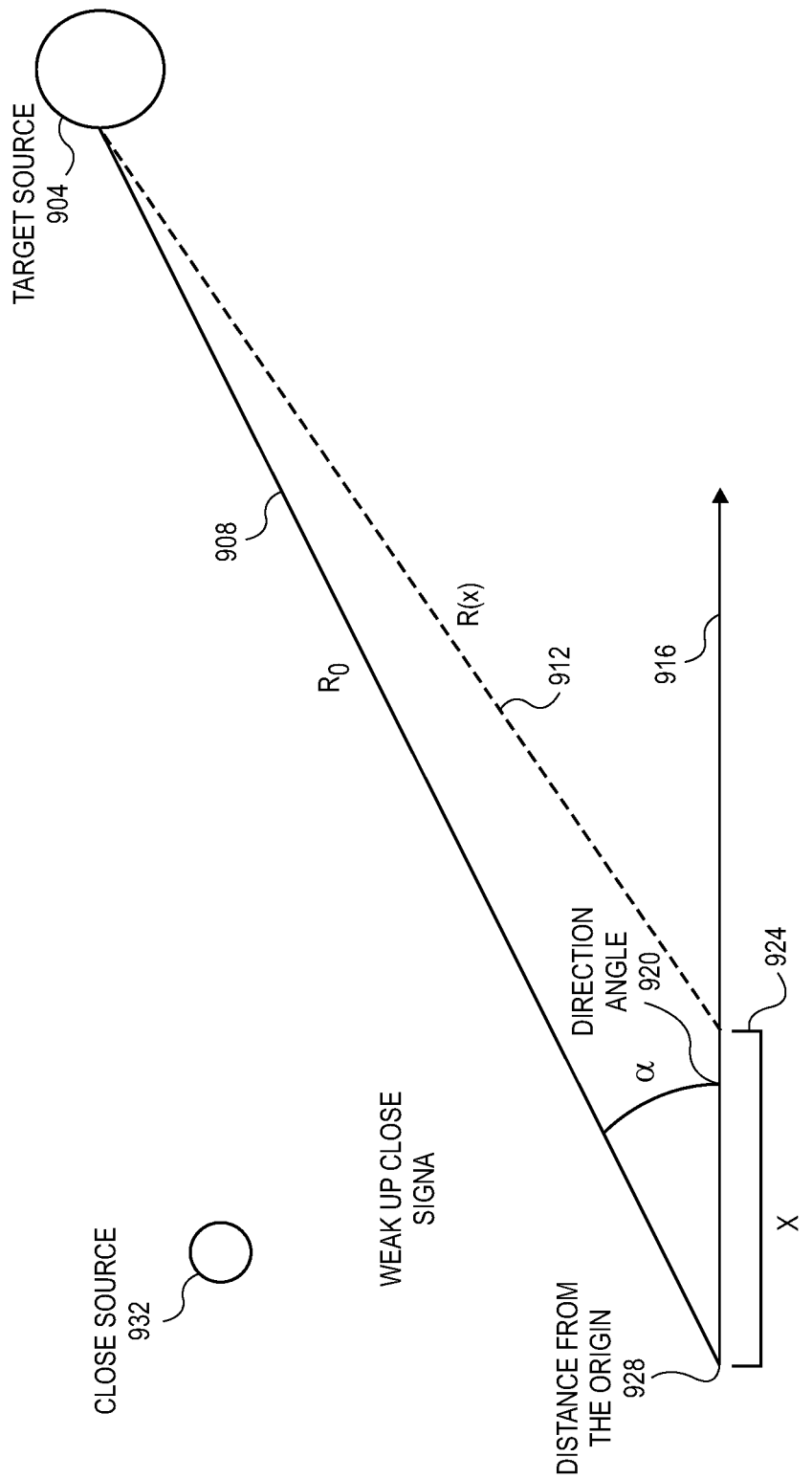
FIG. 9 depicts an example of the geometry of received radio frequency signals at an antenna array.

FIG. 9 is a diagram illustrating an exemplary calculation for detecting the occupancy of an area (e.g. a room) through RF signals. A room with an RF transmitter (e.g., a WiFi gateway) from the perspective of an antenna array appears to have a strong distant signal source 904 and weak up close signal source 932. For example, a RF transmitter on the opposite side of a room will receive strong RF signals directly from the RF transmitter as well as weaker RF signals that appear closer due to reflection off of nearby surfaced. A room may be treated as a collection of RF sources, one or more being distractive strong and (relatively) distant (e.g. from a RF transmitter) that may or may not be in the room. The room may also include one or more "sources" (e.g., a surface of a wall from which signal has reflected) which are weaker and closer in distance to the antenna array. The weaker, up-close signals having lost energy due to reflection from objects or absorption of diffused radiation. FIG. 9 depicts an antenna array being some distance from a target source 904 (e.g., 1-3 meters, though any distance may be used). The antenna array may be of any length and include any number of antennas where more antennas may increase the resolution of the received signals and improve occupancy detection.

For a source, i, the parameter $S_i$ refers to the detected power, $R_{0i}$ refers the distance from the origin (e.g., 928), and $\alpha_i$ refers to the direction angle. The length of the antenna array may be small relative to the distances of a close source(s) 932. As a result of the relative distances, the distance from an RF signal source to any individual antenna of the antenna array may be approximated as the same. In a similar manner, the strength of an RF signal received at any point along the array may also be approximated as the same.

Applying a cosine rule an initial equation to solve for $R_i(x)^2$ (e.g., the square of 912) may be represented as:

$$R_i(x)^2 = R_{0i}^2 + x^2 - 2R_{0i} \cdot x \cdot \cos\alpha_i$$

The equation may be simplified to derive $R_i(x)$ (e.g., 912) represented as:

$$R_i(x) = \sqrt{R_{0i}^2 + x^2 - 2R_{0i} \cdot x \cdot \cos\alpha_i}$$

The change (i.e. delta) in phase between an RF signal received at the origin 928 and a corresponding RF signal received at a point x 924 along the antenna array may be represented as (where $\lambda$ is the wavelength):

$$\Delta\emptyset_i(x) = \frac{2\pi}{\lambda}(R_i(x) - R_{0i})$$

Figure 10:
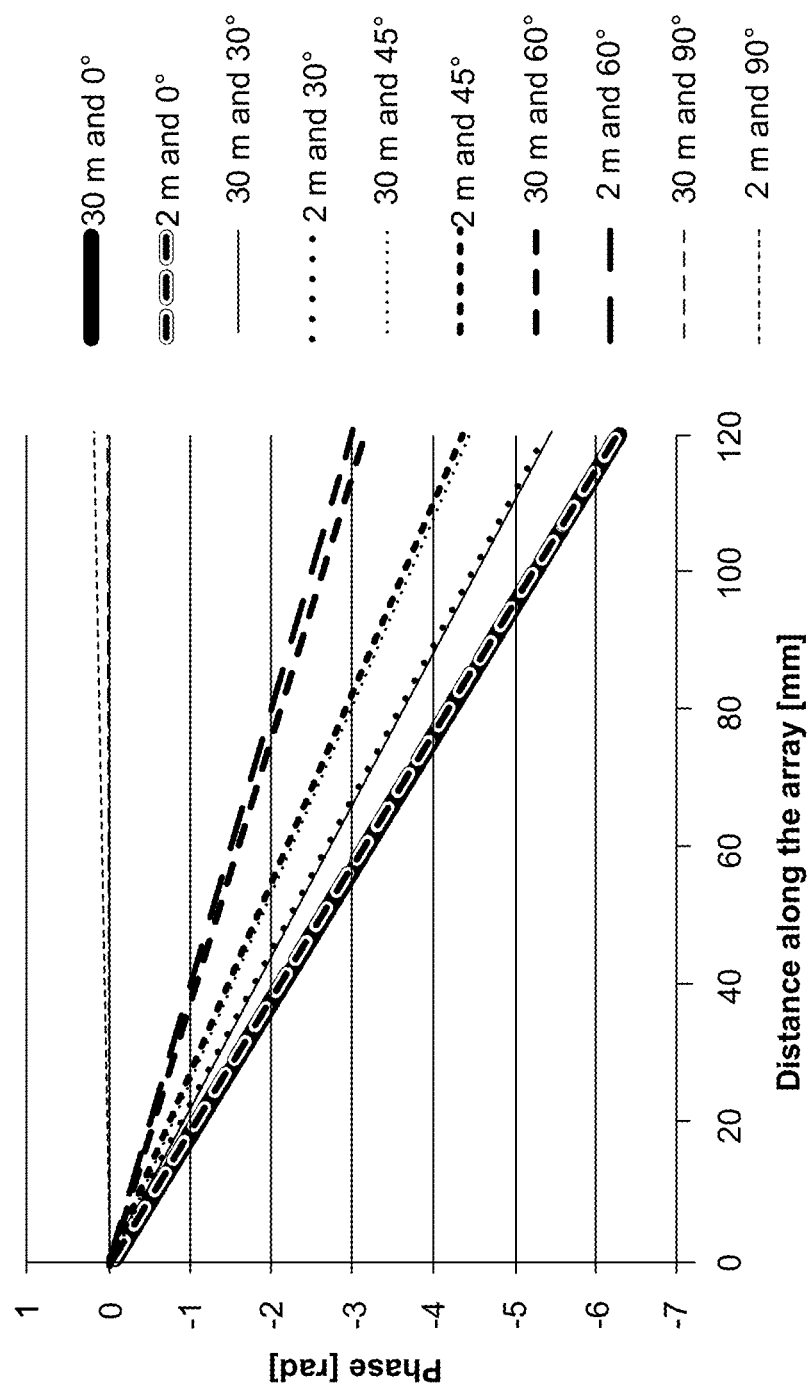
FIG. 10 depicts a graphical representation of the phase change of signals received along an antenna array.

FIG. 10 is a graph showing examples of the phase that may be measured along an antenna array based on receiving RF signals from a single source at different direction angles 920 and at two different distances (e.g., 2 meters and 30 meters from the origin 928). The direction angle 920 is varied between 0 degrees to 90 degrees relative to the origin 928. As show, the distance does not have a large impact on the phase change along the antenna array. The phase of each signal appears to change linearly as the RF signals are received along the antenna array. As the direction angle 920 approaches 90 degrees, a small deviation may be detected.

In the case of multiple sources (e.g. 932 being a close source and 904 being a distance interfering source), distinguishing a particular signal from among interfering signals may be accomplished using the following formulations. For example, assume that source operates on the same frequency (e.g., likely to be the most interfering), but that each sources may have different phases and power (relative to the origin 928). In addition each source may have different distances and origins. By measuring the combined characteristics of RF signals received (across all sources), the individual sources may be identified and characteristics of each source may be determined.

First, a signal may be detected at a point in the array as distinguished from other signals in the area. Each RF signal received at a point x may be represented as:

$$S(x) = A(x) \cdot \sin(\omega t + \emptyset(x))$$

The combined set of signals received may then be represented as:

$$S(x) = \sum_i A_i(x) \cdot \sin(\omega t + \emptyset_i(x))$$

The equation may be simplified based on the small relative distances between antennas of the antenna array versus the distance from the antenna array and the source.

$$S(x) = \sum_i A_i \cdot \sin(\omega t + \emptyset_i(x))$$

Equating the terms of $\sin(\omega t)$ and $\cos(\omega t)$:

$$A(x) \cdot \cos(\emptyset(x)) = \sum_i A_i \cdot \cos(\emptyset_i(x))$$

and $$A(x) \cdot \sin(\emptyset(x)) = \sum_i A_i \cdot \sin(\emptyset_i(x))$$

Using the equations from equating the terms of $\sin(\omega t)$ and $\cos(\omega t)$ above, $A(x)$ can be solved for by the following:

$$A(x) = \sqrt{\left(\sum_i A_i \cdot \cos(\emptyset_i(x))\right)^2 + \left(\sum_i A_i \cdot \sin(\emptyset_i(x))\right)^2}$$

The equation to solve for the phase may be represented as following, where ATAN2 ($\cos\alpha$, $\sin\alpha$) is an arctangent that returns values in the four quadrants.

$$\emptyset(x) = \text{ATAN2}\left(\sum_i A_i \cdot \cos(\emptyset_i(x)), \sum_i A_i \cdot \sin(\emptyset_i(x))\right)$$

A signal may be simulated as coming from a source, i, and received at a point, x, along the antenna array. First $R_i(x)$ may be calculated followed by the phase O (where the variable $\emptyset_{0i}$ is the phase of the $i^{th}$ source at the origin) using:

$$\emptyset_i(x) = \emptyset_{0i} + \frac{2\pi}{\lambda}(R_i(x) - R_{0i})$$

The equations for $A(x)$ and $\emptyset(x)$ (e.g., from paragraph [0067]) may be used to synthesize a resultant signal detected at any point x along the array.

Figure 11:
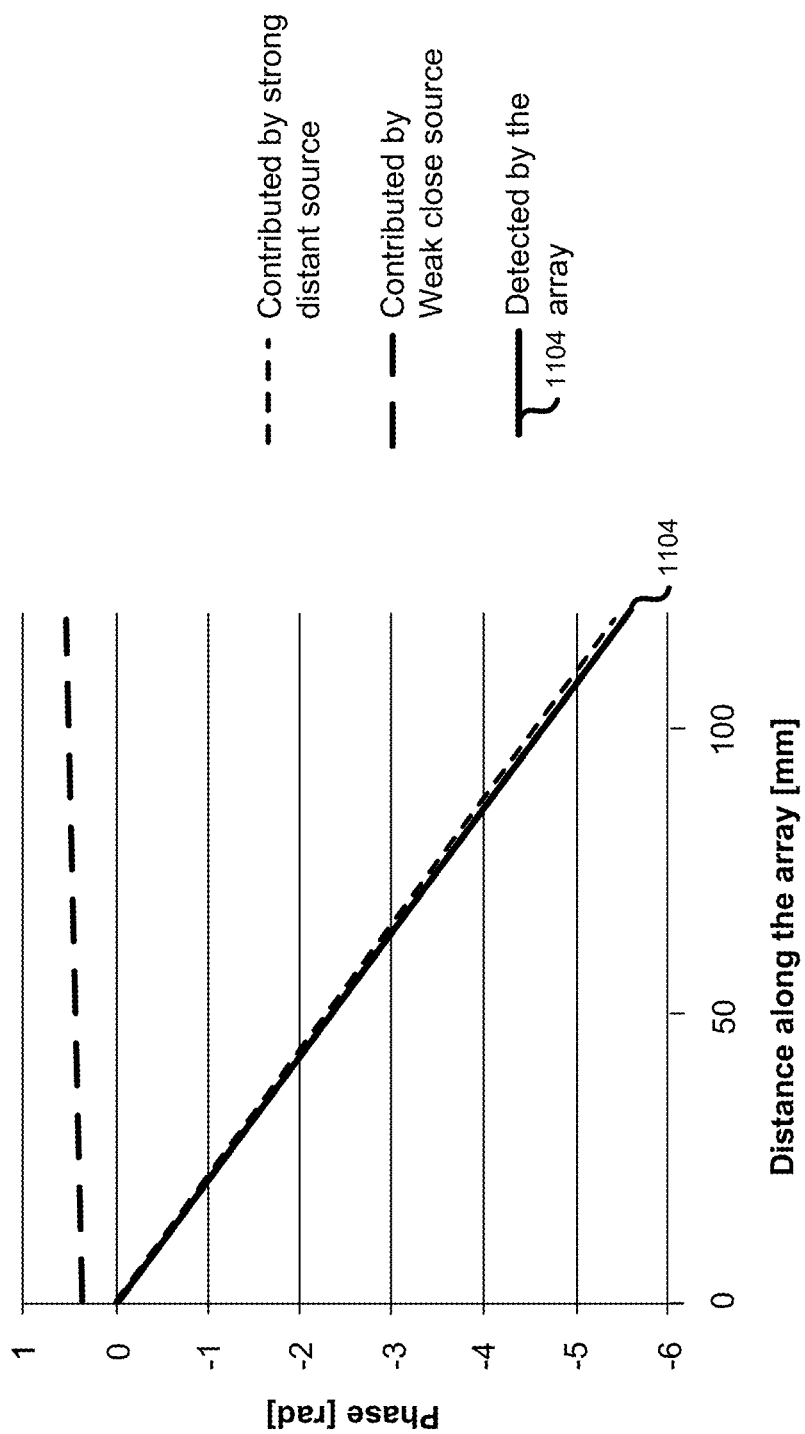
FIG. 11 depicts a graphical representation of the results of filtering some sources of radio frequency signals.

FIG. 11 is a graph with examples of the phases of two sources along an antenna array and a phase of the two RF sources combined when received along the antenna array. In some examples, one RF source may be more desirable to use for occupancy detection. For example, a first source may be broadcasting more consistent RF signals than a second source. Other characteristics may be used to determine a particular source or sources to use for occupancy detection (e.g., phase, frequency, signal strength, consistency, distance from the antenna array, origin location, source movement (or lack thereof), and/or any other characteristic. In some examples, a first source may be more desirable to use for occupancy detection, but a second source may be interfering with the RF signals of the first source. In those examples, the first source may be isolated from the combined RF signals (e.g., filtering the interfering RF signals) to preserve the accuracy of the occupancy detection.

Continuing with the graph of FIG. 11 with reference to the reference numbers of FIG. 9, a first source may be a weak close source 932 and a second source may be a strong, but distant source 904 that is interfering with the close source. The relative power of the two sources may be different such that the close source, being weaker, emits signals at 10% of the power of the distant source. Each source is operating with a different direction angle, thus, the close source, 932 operating close to a 90 degrees direction angle has a near linear phase distribution close to zero (see 1104). The distant source 904 is operating with an approximate 30 degree direction angle causing the measured phase to decrease linearly along the antenna array (see 1108). Since the close source operates with 10% of the power of the distance source, the combined RF signal received at the antenna array when both the close source and the distant source are emitting RF signals at the same time is the line 1104 which measures the same phase as the distance source. Without filtering the distant source, the strong distant source may mask the presence of the weak close source.

As noted above, the phase of sources positioned at roughly 90 degrees include an non-linear phase distribution. The linear aspect of the phase distribution may be filtered to detect the characteristics of the weak close source which may be used for occupancy detection. For example, by using (where $\Delta\phi_{detected}$ is the overall phase difference detected in the two ends of the array and l is the array length):

$$\phi_{filterd}(x) = \phi_{detected}(x) - \frac{\Delta\phi_{detected}}{l} \cdot x$$

Figure 12:
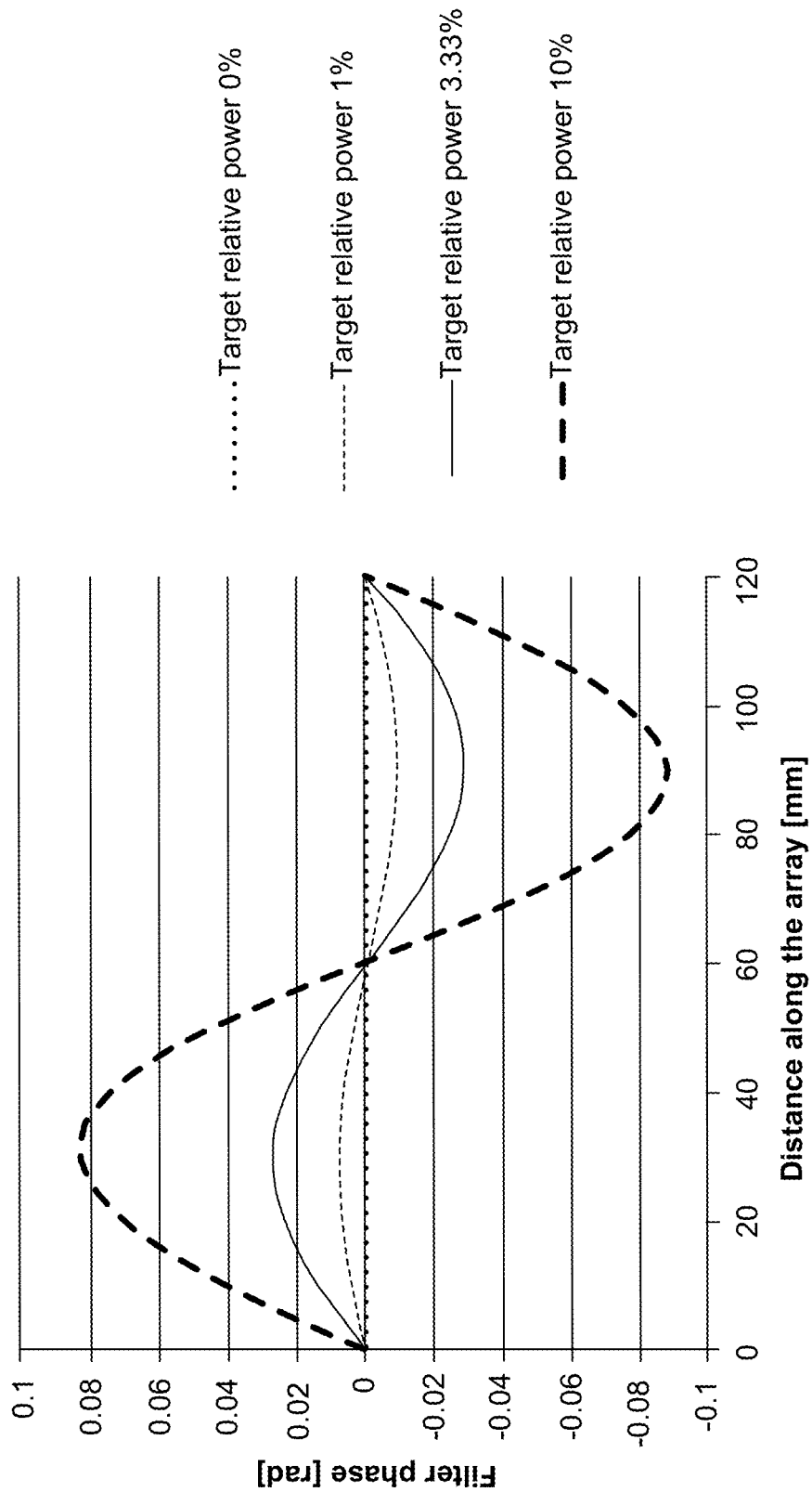
FIG. 12 depicts a graphical representation of the peak-to-peak amplitude of the filtered phase distribution as function of the relative power of the radio frequency signal source.

FIG. 12 is a graph of the filtered phases (the phase of a particular source with others filtered out) over different relative powers. As shown, a weaker source (with a relative power between 0% and 10%) may provide a predictable phase distribution along the antenna array. The larger the relative power of the weaker source the more defined the peaks of the measured phase may be. The phase also follows a particular period regardless of the relative power. For example, each of the received RF signals have the highest and lowest phase at approximately 30 millimeters and 90 millimeters, respectively, of the antenna array. Although antenna array depicted is approximately 120 millimeters, any length antenna array may be used.

Figure 13:
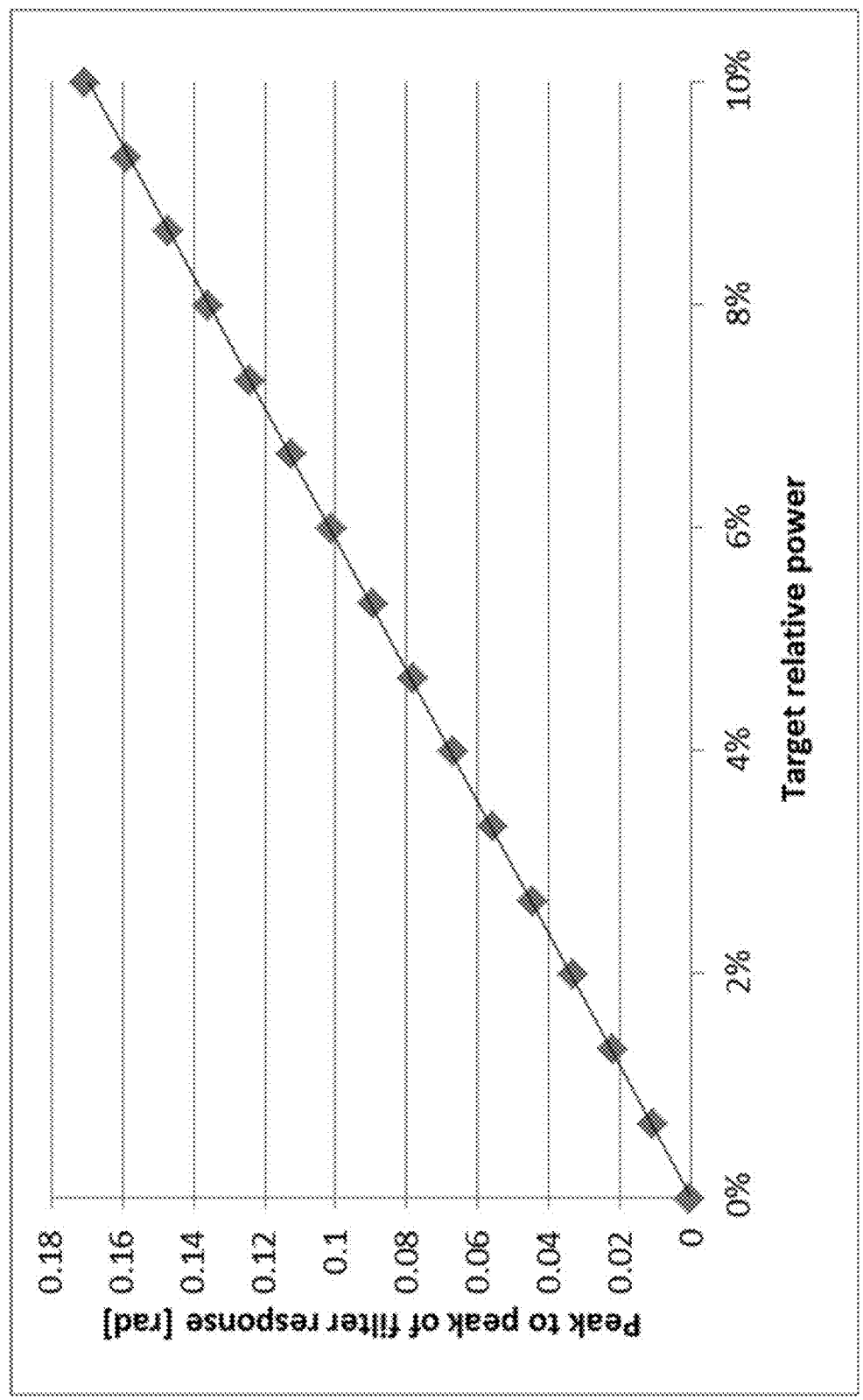
FIG. 13 depicts a graphical representation of the effect of the initial phase of the signal source on the filtered phase distribution when the source of the signal's relative power is fixed.

FIG. 13 is a graph of the peak-to-peak amplitude of the filtered phase distribution of FIG. 12 as a function of the relative power of the source. As shown, the peak-to-peak amplitude of the filtered phase of FIG. 13 increases linearly with the increase in relative power. The linear distribution may improve the detection of a weaker source over a stronger source (using the filtering techniques described above) even where the relative power is extremely low (e.g. less than 1%) or when the relative power is unknown.

Figure 14:
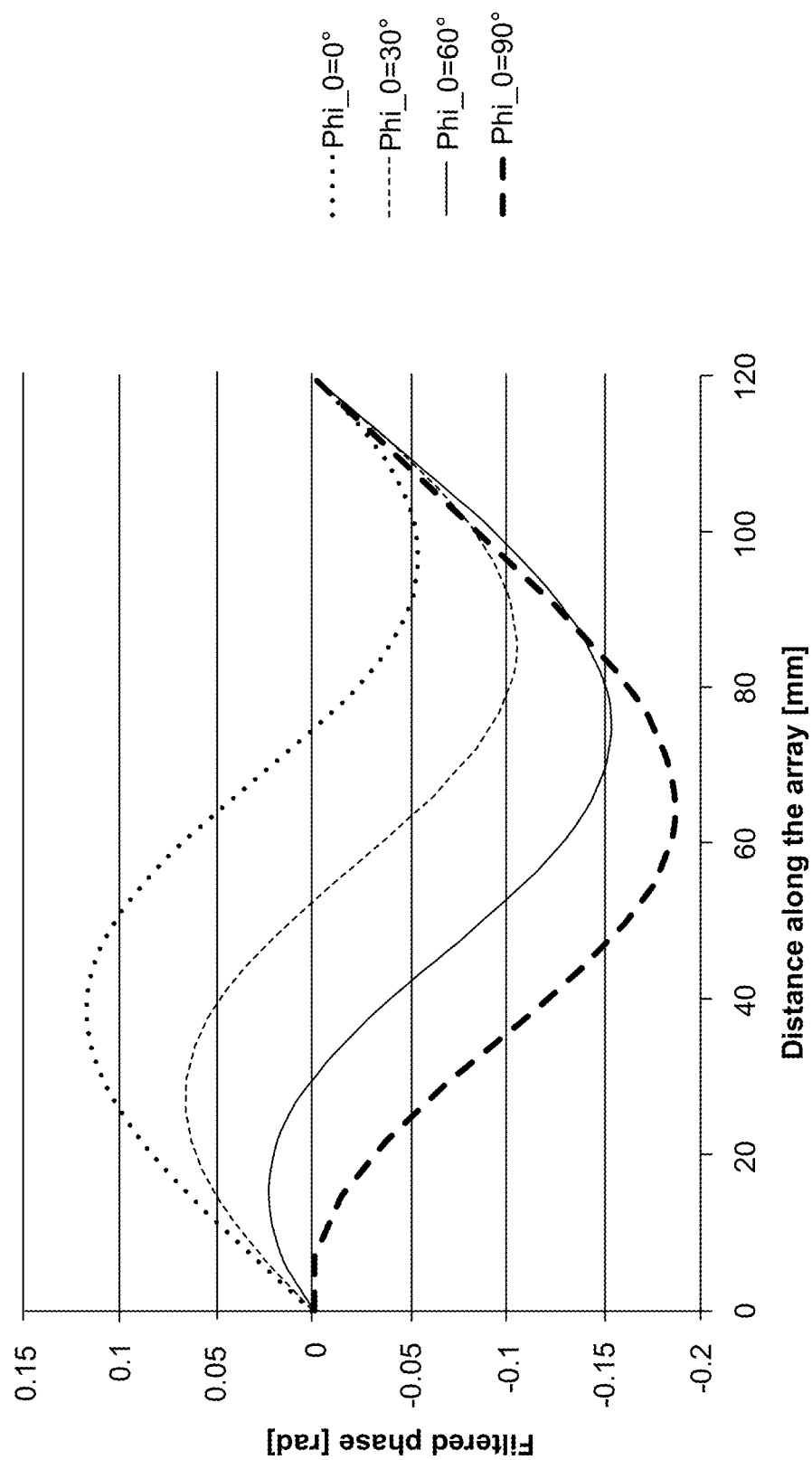
FIG. 14 depicts a graphical representation of the effect of varying the phase angle on the filtered phase distribution.

FIG. 14 is a graph of the filtered phases (e.g., including the measured phase from the isolated source only) of a source with a fixed 10% relative power with varying direction angles (between 0 and 90 degrees). As described above in connection to FIG. 12 and FIG. 13 the direction angle was assumed to be fixed (e.g. at close to 90) in order to exploit the non-linear characteristics of the phase distribution. As shown in FIG. 14, the peak-to-peak amplitude of the phase distributions are nearly constant even when the direction angle is varied. The linear characteristics shown in FIG. 12 and FIG. 13 are not eliminated by altering the direction angle.

Accordingly, as shown in FIG. 9-FIG. 14 and corresponding equations, RF signals corresponding to a particular source may be isolated from other interfering RF signals from other sources. Further, one or more sources may be isolated from one or more other sources thereby improving the accuracy of occupancy detection by ensuring that preferred or predetermined radio frequency sources or radio frequency signals may be consistently and/or reliably employed to detect a change in the occupancy of a predetermined area despite the presence of interfering signals.

Figure 15:
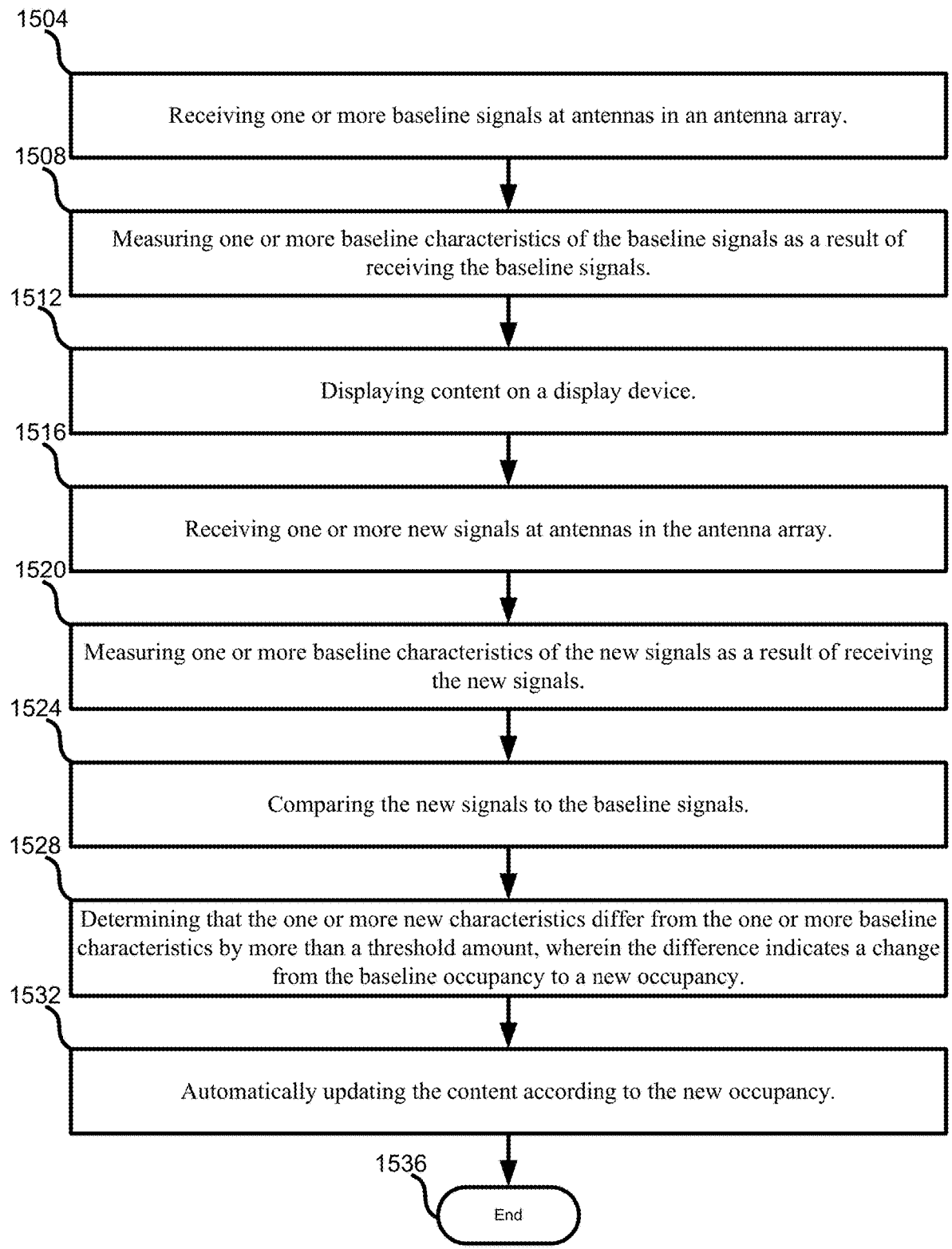
FIG. 15 is a flowchart illustrating an example of a process for detecting an occupancy of a room, according to examples of the present disclosure.

FIG. 15 is a flowchart illustrating an example of a process of detecting a change in the occupancy of a predetermined area using a radio frequency receiver (e.g., an antenna, a transceiver, an antenna array, etc.). For example, an occupant may be any animate object (e.g., human, animal, etc.) or inanimate object (e.g. a piece of furniture). The method begins at step 1504 in which one or more baseline radio frequency signals are received at antennas of an antenna array. The one or more baseline radio frequency signals may be radio frequency signals that are continuously emitted by a radio frequency source inside (or outside) the structure comprising the antenna array. For example, the baseline radio frequency signals may be emitted from a WiFi gateway that operates continuously with a same room as the radio frequency receiver. The radio frequency source may be of any type emitting radio frequency signals intended for the structure or occupant thereof or intended for another structure, vehicle, non-occupant and/or any other destination (e.g., AM/FM radio frequency signals). The radio frequency source may emit any type or frequency of radio frequency signals from any geographic location (e.g., within the structure, nearby the structure, or from some place remote from the structure).

In some examples, the baseline radio frequency signals are received at time when the occupancy of the predetermined area is known or may be inferred. For example, the baseline radio frequency signals may be received at 4:00 AM at a time when occupants of a structure (e.g., a building, house, etc.) are likely to be asleep in a different area from the predetermined area. For another example, the baseline radio frequency signals may be received at 2:00 PM on a Tuesday when the structure itself is likely to be unoccupied. While the aforementioned examples include examples where the occupancy is zero or likely zero, other such scenarios in which the occupancy is not zero, but which may be known or inferred, may also be possible. For example, the one or more baseline radio frequency signals may be received when the predetermined area is known to have (or may be inferred to have) a single occupant. In those examples, the occupancy detection may process one or more subsequent radio frequency signals to determine an occupancy of the predetermined area is one of the same, increasing, decreasing, and/or an exact number of occupants.

In some examples, the one or more baseline radio frequency signals include a plurality of baseline radio frequency signals received over a period of any predetermined duration (e.g. 30 seconds, 1 minute, 30 minutes, 24 hours, etc.) and are aggregated into a set of signals, an average of baseline signals, and/or the like. For example, receiving the one or more baseline radio frequency signals may include generating a set of all radio frequency signals received at a time period beginning at 4:00 AM to 4:05 AM (or an average of those signals). In some examples, the one or more baseline radio frequency signals may be received repeatedly or continuously until such time as a change in the received radio frequency signals is detected, a command is received, user input, and/or by any other means. For example, the one or more baseline radio frequency signals may be received with older radio frequency signals being discarded (e.g. every signal may discarded once after five minutes of receipt) until a change in the signals is detected that indicates a change in occupancy is likely. In those examples, the baseline radio frequency signals are persistently collected beginning at the period at which the baseline occupancy is known or inferred and continuing until the change in occupancy is detected. Accordingly, receiving baseline radio frequency signals at a single instance (or period) may not be necessary.

In other examples, the baseline radio frequency signals may be received once and only received again upon some predetermined event. For example, the subsequent baseline radio frequency signals may be received only once the original baseline signals are determined (or likely) to be stale, inaccurate, or expired. In other words, the baseline radio frequency signals may expire after a predetermined time period enabling the receipt of new baseline radio frequency signals. The baseline radio frequency signals may be received in regular intervals (e.g., every 30 minutes, every day, every week, etc.) to increase the accuracy of the occupancy detection. For example, the baseline signals may be received every morning at 4:00 AM. In some examples, the new baseline signals may be received based on a change in the signals being broadcast in the area, where the change does not indicate a change in occupancy. For example, if the baseline signals are on a particular inconsistent frequency (e.g., poorly received cellular frequencies) a new baseline may be received upon detecting better quality or more consistent signals (e.g. a nearby WiFi gateway). Baseline signals may be received in any interval, time period, schedule, or mechanism provided that collecting baseline's correspond to the known or inferred occupancy of the predetermined area. For example, baseline signals may be received up to a point in which a new signal implies that a change in occupancy of the predetermined area has occurred. At that point, the baseline is preserved and/or used for later occupancy analysis until new baseline signals may be received.

The one or more baseline radio frequency signals may be received on any of one or more radio frequencies. For example, the antenna array may receive radio frequencies signals emitted on any number of frequencies including WiFi frequencies (e.g., 2.4 GHz or 5 GHz), cellular frequencies (e.g. 800 MHz and/or 1900 MHz), Amplitude Modulated (AM) frequencies (e.g. 535-1605 kHz), Frequency Modulation (FM) frequencies (e.g., 88-108 MHz), Very High Frequencies (VHF) (e.g., 54-210 MHz), Ultra High Frequencies (UHF) (e.g., 470-884 MHz), and/or any other frequency. In some examples, when signals are detected on more than one frequency, one or more of the received signals are selected to be the one or more baseline radio frequencies signal automatically according to the signals or frequency that would be suited for occupancy detection, based on a preselected criteria, a user input, a command, and/or by any other means. In some examples, the baseline radio frequency signals include signals emitted on different frequencies (e.g. 2.4 GHz and 1900 MHz) and/or from different sources. For example, the baseline radio frequency signals may include some signals emitted from a WiFi gateway and some radio frequency signals emitted from an AM/FM source. In such cases, the method may, but necessarily, employ a second (or more) antenna array. In some examples, the baseline signals may be received from a mobile source (such as a cellular phone without a fixed position that emits radio frequency signals on a cellular frequency and/or WiFi frequency).

At step 1508, one or more baseline characteristics of the baseline radio frequency signals are measured as a result of receiving the baseline radio frequency signals at the antenna array. In some examples, the particular characteristics that are measured may be predetermined or determined automatically, by user input, by a command executed by a processor, by a remote command issued to a device associated with the antenna array (e.g. a computing device, television, specialized processing device, etc.). The one or more characteristics may include a frequency, an amplitude, an origin, a distance, and/or other information carried by the signal (e.g. data packets of a WiFi transmission destined for a particular device or the WiFi gateway), a timestamp, extrinsic information associated with the signal such as information from a device or sensor (e.g. microphone, camera, lidar, smart home device, and/any other type of sensor) connected to the antenna array, or from a user, remote device, or server, and/or any other characteristic associated with a radio frequency signal.

In some examples, the one or more baseline radio frequency signals used to generate a baseline data structure. The baseline data structure may include the one or more baseline signals, previously collected baseline radio frequency signals, characteristics corresponding the baseline signals, extrinsic information corresponding to the system, the predetermined area, the antenna array, and/or the baseline signals or any other information associated with the baseline radio frequency signals. In some examples, the baseline may include or be used to generate an image and or a set of images (e.g. video) of the predetermined area based on the baseline signals received. For example, the antenna array may produce an image similar to images produced by synthetic-aperture radar systems, but using the radio frequencies received by the antenna array (e.g. baseline signals) rather than an active transceiver array. In some examples, the antenna array may be a transceiver that transmits one or more radio frequency signals and records any response and/or returning reflected signals to generate an image of the predetermined area or to determine an occupancy of the predetermined area.

In some examples, the image and/or set of images are used either partly or entirely to determine an occupancy of the predetermined area. For example, image analysis may be used to identify and/or categorize shapes, objects, and/or humans that appear in the image. For example, the image may be used to identify a baseline occupancy of the predetermined area (i.e. unoccupied or occupied by a particular animate or inanimate object). In some examples, the baseline data structure and/or any generated images or set of images may be stored in a memory of a computing device, television, specialized processing device, a remote server, a third-party server, and/or the like. In some examples previously stored baseline data structures are deleted upon the expiration of a predetermined time period, the generation of a new baseline data structure, user input, remote command, and/or the like.

At step 1512, a display device (e.g. a television) associated with the antenna array may begin display content. For example, the content may be selected by an occupant of the predetermined area, a remote device, previously selected, and/or the like. In some examples, the antenna array may be built into or otherwise apart of the display device. In some examples, the antenna array may be transmit data (such as received signals) the display device or other processing device via a wired or wireless interface. For example, the raw data corresponding to the received radio frequency signals may be transmitted the display device. A processor of the display device may then process the raw data to provide an occupancy or change in occupancy determination. In some examples, the antenna array may be located remotely from the display device and transmit the raw data to a remote server device for processing. In those examples, the antenna array and any data collection may not be affiliated with the display device and/or content displayed thereon, but may provide an association between particular content displayed by the display device and the occupancy.

At step 1516, one or more new radio frequency signals are received by antennas of the antenna array. In some examples, the new radio frequency signals are received based on the occurrence of an event. For example, the event may be based on particular content being displayed by the display device, a time, sensor input, a change in a characteristic of radio frequency signals in the predetermined area, user input, a command issued locally or from a remote resource, and/or the like. In some examples, the one or more new radio frequency signals may be received on a same one or more frequencies as the baseline radio frequency signals. In other examples, new radio frequency signals may be received on one or more different frequencies or on a partially overlapping set of frequencies (e.g., some frequencies being the same and some being different).

At step 1520, one or more characteristics corresponding to the one or more new radio frequency signals is measured. In some examples, the same or similar set of characteristics may be measured for the one or more new radio frequency signals and the one or more baseline radio frequency signals. The one or more characteristics may include a frequency, a strength (e.g., amplitude), an origin, a distance, data and/or other information carried by the signal (e.g. data packets of a WiFi transmission destined for a particular device or the WiFi gateway), a timestamp, extrinsic information associated with the signal such as information from a device or sensor (e.g. microphone, camera, lidar, smart home device, and/any other type of sensor) connected to the antenna array or from a user or remote device or server, or any other characteristic associated with a radio frequency signal.

In some examples, the new radio frequency signals are used to generate new signal data structure (e.g. data structure that corresponds in format and structure to the baseline data structure). The new signal data structure may include the one or more new radio frequency signals, aggregated new radio frequency signals, an average of new radio frequency signals received over a predetermined period after the triggering event, characteristics corresponding the new signals, extrinsic information record or received with or at the same time as the new radio frequency signals, or any other information associated with the new radio frequency signals. In some examples, the new signal data structure may include or be used to generate an image and or a set of images (e.g. video) of the predetermined area based on the new radio frequency signals received.

At step 1524, the new radio frequency signals are compared to the baseline radio frequency signals. In some examples, one or more measured characteristics corresponding to the new radio frequency signals are compared to a corresponding one or more of the measured characteristics of the baseline radio frequency signals. For example, the strength (e.g., amplitude) of a new signal may be compared to the strength of a baseline signal. In some examples, the new radio frequency signals may be received on a different frequency range from the baseline radio frequency signals. In those examples, a direct comparison of the baseline signals and/or the corresponding characteristics with the new signals may be infeasible and alternative comparison method may be selected.

For example, energy of radio frequency signals at 2.4 GHz are more like be absorbed by water including the water within a human body. Radio frequency signals at 2.4 GHz that pass by a human will be more likely be absorbed by the human rather than reflected. Any subsequent signal received by the antenna array will be a substantially lower strength than if the signal were received without such interference. Radio frequency signals at 5 GHz are more likely to reflect off of a human rather than be absorbed. Any subsequent signal may be received at a lower strength (though not as low as at 2.4 GHz), but more likely from a different direction (due to the higher likelihood of reflection). Further, signals at 5 GHz generally are more sensitive to interfering objects and travel in a shorter overall distance than signals at 2.4 GHz. Accordingly, baseline signals at 2.4 GHz and new signals at 5 GHz may be misinterpreted if directly compared.

In some examples, one or more characteristics of the baseline signals are compared to one or more characteristics of the new signals. For example, the strength, distance, and/or origin of the baseline signals may be compared to the strength, distance, and/or origin of the new signals. Even if the new signals are of a different frequency range from the baseline signals the comparison of multiple data points may increase the accuracy of the comparison and reduce the likelihood that a mere artifact of the frequency of the signal may cause a misinterpretation of data and subsequently a occupancy of the predetermined area. Any number of characteristics baseline signals may be compared to any number of characteristics of new signals.

In some examples, the one or more characteristics that are used to compare the baseline signals to the new signals may be determined dynamically at runtime based on the circumstances that may be present. For example, the difference in frequency may be detected and result in a particular selection of one or more characteristics that may be compared to maintain the reliability of the occupancy determination. The characteristics may be selected automatically (by the display device or other processing device), by user input, by remote instructions issued from a remote server, from a third-party server, and/or the like. In some examples, the characteristics may not be sufficient to provide a feasible comparison. In those example, the new signal data structure may be compared to the baseline data structures. For example, if the baseline signals differ from the new signals due to circumstances that do not imply a change in occupancy (such as burst of interfering radio frequency signals), the baseline data structure and new signal data structure may provide a neutral format that may enable a reliable comparison.

In some examples, the comparison may include comparing an image or set of images from or generated using the baseline data structure to a corresponding image or set of images from or generated using the new signal data structure. For example, image processing or pixel analysis may be used to compare corresponding images or sets of images. Though particular means of comparison have been described, any means of comparison and/or combinations thereof may be used to compare the baseline signals to the new signals.

At step 1528, a determination is made as whether the difference between the baseline signals and the new signals exceeds a threshold amount where exceeding the threshold provides an indication that the baseline occupancy has changed to a new occupancy. The threshold may be dynamically determined at runtime. For example, the threshold may be determined based on characteristics of the baseline signals, characteristics of the new signals, based on the corresponding data structures of the new signals and baseline signals, and/or based on the means of comparison. In some examples, the threshold may be set by a user, preset, received by software instructions from a remote server, and/or any other means.

For example, referring back to FIG. 3, the comparison method may be signal strength and the threshold may be set to 3 decibels. At 304, the signals being received are at approximately −12.5 decibels and the threshold is not being exceeded. At 308, the signal strength of new signals may be approximately −18 decibels. Since the difference between −12.5 and −18 is greater than the 3 decibel threshold, an indication may be made that the baseline occupancy of the predetermined area has changed to a new occupancy. For example, the baseline occupancy may include zero occupants and the new occupancy may indicate the presence of one or more occupants. For another example, the baseline occupancy may indicate the presence of one or more occupants and the new occupancy may indicate the presence of zero occupants.

At step 1532, one or more actions are performed as a result of determining that that new signals differ from the baseline signals by more than the threshold amount. In some examples, alternative content may be displayed by the display device. For example, based on determining that there is an occupant in the predetermined area the display device may display an advertisement or other contextually related content. In some examples, the action may include displaying contextually relevant content by the display device, storing an association of the occupancy with content currently displayed by the display device, storing the occupancy, transmitting the occupancy to a remote device, transmitting an association of the occupancy with content currently displayed by the display device, and/or the like. In some examples, the action may include powering on or powering off the display device or one or more other devices in the predetermined area.

Once the one or more actions have been executed the method may determine whether to return to step 1504 and receive new baseline signals. For example, the baseline signals and/or baseline data structure may have expired or otherwise may not be as reliable or accurate as a new baseline. If it is determined that a new baseline is to be received than the method returns to step 1504 and the remainder of the steps, 1508-1542 are repeated. If it is determined that a new baseline is not necessary the method may return to step 1512 or 1516 in which content may be displayed by the display device or subsequent new radio frequency signals may be received and steps 1516-1532 or 1520-1532 respectively may be repeated. On the other hand, if it is determined that the method is to conclude that the method proceeds to step 1536 and terminates.

Figure 16:
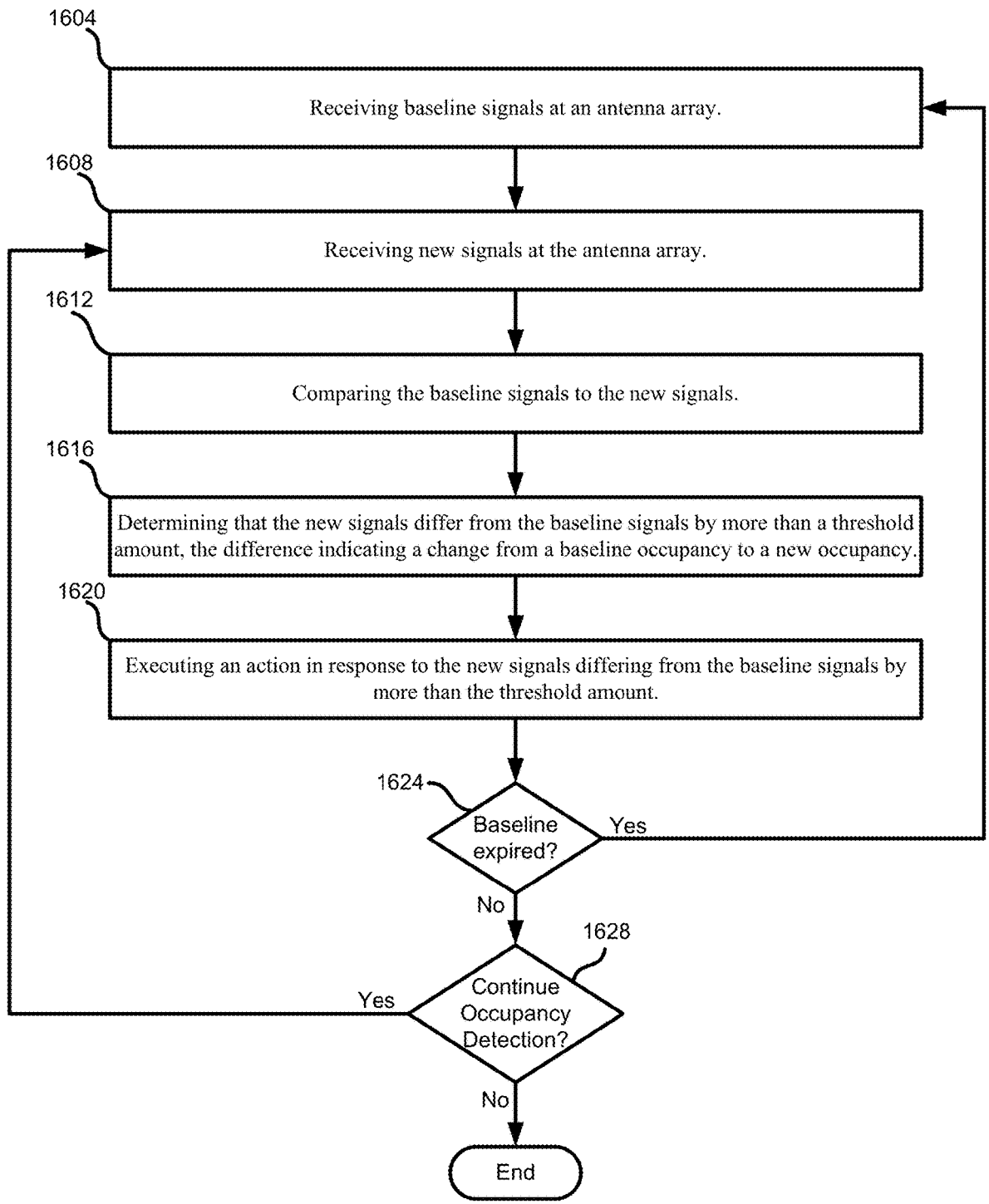
FIG. 16 is a flowchart illustrating another example of a process for detecting an occupancy of a room, according to examples of the present disclosure.

FIG. 16 is a flowchart illustrating an example of a process of detecting a change in the occupancy of a predetermined area using an antenna array. The method begins at step 1604, in which baseline radio frequency signals are received at an antenna array. In some examples, the baseline signals are received at a time in which the occupancy of the predetermined area is known or may be inferred. For example, the baseline signals may be received early in the morning (e.g. 4:00 AM) when occupants are likely to be in a different area of the structure comprising the predetermined area or at time in which occupants are not in the structure at all.

At step 1608, new signals are received by the antenna array. The new signals may be received at a later time from the baseline signals. In some examples, the new signals are received in response to a triggering event. For example, the triggering event may be particular content being displayed by a display device, the display device powering on or off, a command issued to a processing device, user input, one or more software instructions received from a remote server, a time period expiring, and/or the like.

At step 1612, the new signals are compare to the baseline signals. In some examples, the signals are compare directly to each other. In some examples, one or more characteristics of the new signals are compare to one or more corresponding characteristics of the baseline signals. In some examples, a particular comparison method or algorithm may be selected to dynamically at runtime based on circumstance present at the time. Any such comparison method or combination of comparison methods may be selected to determine the differences between the new signals and the baseline signals.

At step 1616, it is determined whether the new signals differ from the baseline signals by more than a threshold amount, where exceeding the threshold is indicative of a change in the occupancy of the predetermined area. The threshold may be dynamically determined at runtime, preselected, based on user input, or by one or more instructions received by a remote sever. In some examples, the threshold may be set to an amount that indicates the occupancy has increased by one or more individuals or decreased by one or more individuals. For example, the threshold may be set to an amount such that exceeding the threshold indicate the presence of three occupants.

At step 1620, one or more actions may be executed as a result of the new signals differing from the baseline signals by more than a threshold amount which thereby indicates a change in occupancy. The one or more actions may include displaying contextually relevant content by a display device, storing an association of the occupancy with content currently displayed by a display device, storing the occupancy, transmitting the occupancy to a remote device, transmitting an association of the occupancy with content currently displayed by a display device, powering on or off a device, and/or the like. If it is determined that the new signals do not differ from the baseline signals by more than the threshold amount the method skips to step 1624.

At step 1624, it is determined whether the baseline signals have expired. For example, the baseline signals may expire based on: reaching the conclusion of a period of time (e.g. 24 hours), user input, a determination (automatic or manual) that the baseline signals are no longer or not likely to be accurate or reliable for use in occupancy detection, and/or the like. In some examples, the previous calculation of occupancy detection may be analyzed to determine whether updating the baseline signals may increase the accuracy of the occupancy detection. For example, upon comparing the new signals to the baseline signals it may reveal the presence of interference (other than the type of interference that may indicate a change in occupancy). It may be determined that updating the baseline signals with subsequent baseline signals may provide cleaner radio frequency signals for more accurate occupancy detections. Upon determining that the baseline signals have expired, the method returns to step 1604 in which new baseline signals are received. If it is determined that the baseline has not expired, the method moves to step 1628.

At step 1628, it is determined whether occupancy detection is to continue. In some examples, occupancy detection occurs continuously, in response to an event or action, in intervals (set automatically or manually), and/or the like. In some examples, occupancy continues until a display device associated with the antenna array is power off or is no longer displaying particular content. In some examples, occupancy detection continues until an event occurs, user input, instructions received by a remote server, a change in a type, quantity, or other characteristic of received radio frequency signals at the antenna, and/or any other event or input indicative of terminating occupancy detection. If it is determined that occupancy detection is to continue, the method returns to step 1608 in which subsequent new signals may be received and steps 1612-1628 are repeated. If it is determined that the occupancy detection is to terminate the method as a whole terminates.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method, comprising:
   receiving one or more baseline signals at antennas of an antenna array, wherein the antenna array is included with a display device and is focused to receive baseline signals that are within a predetermined area, the predetermined area including an area in which content displayed by the display device is viewable;
   measuring one or more baseline amplitudes produced by the antenna array included with the display device as a result of receiving the one or more baseline signals, wherein the one or more baseline amplitudes is indicative of the predetermined area having a baseline occupancy;
   displaying content on the display device;
   receiving one or more new signals at antennas of the antenna array included with the display device, wherein the one or more new signals are received after the one or more baseline signals;
   measuring one or more new amplitudes produced by the antenna array included with the display device as a result of receiving the new signals;
   comparing the one or more new amplitudes to the one or more baseline amplitudes;
   determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and
   in response to the indication of the change from the baseline occupancy to the new occupancy, determining the content displayed on the display device is being viewed and executing one or more actions.

2. The method of claim 1, wherein the one or more baseline signals and the one or more new signals are received on a frequency of one of 2.4 GHz and 5 GHz.

3. The method of claim 1, wherein the antenna array is included in the display device.

4. The method of claim 1, wherein the one or more baseline signals are received over a period of a predefined duration.

5. The method of claim 1, wherein the new occupancy is indicative of a viewer of the display device being within the predetermined area.

6. The method of claim 1, wherein the new occupancy is indicative of two or more viewers of the display device being within the predetermined area.

7. The method of claim 1, further comprising:
   receiving subsequent signals at antennas of the antenna array, wherein the subsequent signals are received after the one or more new signals;
   measuring one or more subsequent amplitudes produced by the antenna array as a result of receiving the subsequent signals;
   comparing the one or more subsequent amplitudes to the one or more baseline amplitudes; and
   determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

8. A system comprising:
   one or more processors;
   an antenna array configured to receive one or more signals, the antenna array being included with a display device and focused to receive signals that are within a predetermined area, the predetermined area including an area in which content displayed by the display device is viewable;
   a non-transitory machine-readable storage medium containing instructions, which when executed on the one or more processors, cause the one or more processors to perform operations including:
      receiving one or more baseline signals at antennas of the antenna array;
      measuring one or more baseline amplitudes produced by the antenna array included with the display device as a result of receiving the one or more baseline signals, wherein the one or more baseline amplitudes is indicative of the predetermined area having a baseline occupancy;
      displaying content on the display device;

receiving one or more new signals at antennas of the antenna array included with the display device, wherein the one or more new signals are received after the one or more baseline signals;

measuring one or more new amplitudes produced by the antenna array included with the display device as a result of receiving the new signals;

comparing the one or more new amplitudes to the one or more baseline amplitudes;

determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and in response to the indication of the change from the baseline occupancy to the new occupancy, determining the content displayed on the display device is being viewed and executing one or more actions.

9. The system of claim 8, wherein the one or more baseline signals and the one or more new signals are received on a frequency of one of 2.4 GHz and 5 GHz.

10. The system of claim 8, wherein the antenna array is positioned in the display device.

11. The system of claim 8, wherein the one or more baseline signals are received over a period of a predefined duration.

12. The system of claim 8, wherein the new occupancy is indicative of a viewer of the display device being within the predetermined area.

13. The system of claim 8, wherein the new occupancy is indicative of two or more viewers of the display device being within the predetermined area.

14. The system of claim 8, further comprising:
receiving subsequent signals at antennas of the antenna array, wherein the subsequent signals are received after the one or more new signals;

measuring one or more subsequent amplitudes produced by the antenna array as a result of receiving the subsequent signals;

comparing the one or more subsequent amplitudes to the one or more baseline amplitudes; and determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

15. A non-transitory machine-readable storage medium containing instructions, which when executed on one or more processors, cause the one or more processors to perform operations including:
receiving one or more baseline signals at antennas of an antenna array, wherein the antenna array is included with a display device and is focused to receive baseline signals that are within a predetermined area, the predetermined area including an area in which content displayed by the display device is viewable;

measuring one or more baseline amplitudes produced by the antenna array included with the display device as a result of receiving the one or more baseline signals, wherein the one or more baseline amplitudes is indicative of the predetermined area having a baseline occupancy;

displaying content on the display device;

receiving one or more new signals at antennas of the antenna array included with the display device, wherein the one or more new signals are received after the one or more baseline signals;

measuring one or more new amplitudes produced by the antenna array included with the display device as a result of receiving the new signals;

comparing the one or more new amplitudes to the one or more baseline amplitudes;

determining that the one or more new amplitudes differ from the one or more baseline amplitudes by more than a threshold amount, wherein determining that the one or more new amplitudes differs from the one or more baseline amplitudes by more than the threshold amount indicates a change from the baseline occupancy to a new occupancy; and in response to the indication of the change from the baseline occupancy to the new occupancy, determining the content displayed on the display device is being viewed and executing one or more actions.

16. The non-transitory machine-readable storage medium of claim 15, wherein the one or more baseline signals and the one or more new signals are received on a frequency of one of 2.4 GHz and 5 GHz.

17. The non-transitory machine-readable storage medium of claim 15, wherein the antenna array is included in the display device.

18. The non-transitory machine-readable storage medium of claim 15, wherein the one or more baseline signals are received over a period of a predefined duration.

19. The non-transitory machine-readable storage medium of claim 15, wherein the new occupancy is indicative of a viewer of the display device being within the predetermined area.

20. The non-transitory machine-readable storage medium of claim 15, wherein the operations further include:
receiving subsequent signals at antennas of the antenna array, wherein the subsequent signals are received after the one or more new signals;

measuring one or more subsequent amplitudes produced by the antenna array as a result of receiving the subsequent signals;

comparing the one or more subsequent amplitudes to the one or more baseline amplitudes; and determining that the one or more subsequent amplitudes differ from the one or more baseline amplitudes by less than the threshold amount, wherein determining that the one or more subsequent amplitudes differ from the one or more baseline amplitudes by less than the threshold amount indicates a change from the new occupancy to the baseline occupancy.

\* \* \* \* \*